US006967990B1

(12) United States Patent
Suzuki et al.

(10) Patent No.: US 6,967,990 B1
(45) Date of Patent: Nov. 22, 2005

(54) INTERFERENCE CANCELLATION APPARATUS APPLIED IN CDMA COMMUNICATION SYSTEM AND METHOD FOR THE SAME

(75) Inventors: Takeo Suzuki, Tokyo (JP); Hideshi Murai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 915 days.

(21) Appl. No.: 09/650,084

(22) Filed: Aug. 29, 2000

(51) Int. Cl.[7] ........................... H04B 1/707; H04B 1/10

(52) U.S. Cl. ...................... 375/148; 375/144; 455/296; 455/501

(58) Field of Search ................................ 375/144, 148, 375/140, 141, 147; 455/296, 501

(56) References Cited

U.S. PATENT DOCUMENTS

| | | | | |
|---|---|---|---|---|
| 5,953,369 | A * | 9/1999 | Suzuki | 375/148 |
| 6,526,271 | B1 * | 2/2003 | Uesugi et al. | 455/296 |
| 6,574,204 | B1 * | 6/2003 | Lee | 370/335 |

FOREIGN PATENT DOCUMENTS

| | | |
|---|---|---|
| JP | 5-91082 | 4/1993 |
| JP | 7-273713 | 10/1995 |
| JP | 8-46546 | 2/1996 |
| JP | 8-79130 | 3/1996 |
| JP | 9-64846 | 3/1997 |
| JP | 10-28083 | 1/1998 |
| JP | 10-51353 | 2/1998 |

OTHER PUBLICATIONS

Wijting et al., Groupwise serial multiuser detectors for multirate DS-CDMA, May 1999, IEEE, Vehicular Technology Conference, pp. 836-840.*

Mamoru Sawahashi, et al. "Serial Canceler Using Recursive Channel Estimation by Pilot Symbols for DS-CDMA", Technical Report of IEICE, SAT95-14, RCS95-50, The Institute of Electronics Information and Communication Engineers, pp. 1-2, 43-48, Jul. 1995.

Yukihiko Okumura, et al. "Variable Rate Data Transmission with Blind Rate Detection for Coherent DS-CDMA Mobile Radio", Electronics Letters, vol. 32, No. 20, pp. 1865-1866, Sep. 26, 1996.

Yukihiko Okumura, et al. "Blind Rate Detection using Reception Code in DS-CDMA Variable Rate Data Transmission", National Conference of IEICE (Society Conference B-5-43), pp. 1-2 and 296, 1997.

* cited by examiner

*Primary Examiner*—Khai Tran
*Assistant Examiner*—David B. Lugo
(74) *Attorney, Agent, or Firm*—Oblon, Spivak, McClelland, Maier & Neustadt, P.C.

(57) ABSTRACT

When transmission rate information and required quality information for each user are known, each of the K units of multipliers (where K is a natural number and represents the number of users) multiplies the transmission rate information and the required quality information for each user. A sorting circuit estimates the power of the incoming signal based on the value output by the multipliers, determines the rank of the users based on the estimated power between users, and sends the information on the rank of the users to the first stage. Interference cancellation is then sequentially executed from the first stage to the final stage based on the rank information.

19 Claims, 18 Drawing Sheets

INTERFERENCE CANCELLATION APPARATUS APPLIED IN CDMA COMMUNICATION SYSTEM AND METHOD FOR THE SAME

FIELD OF THE INVENTION

The present invention relates to an interference cancellation apparatus applied in a communication system using the Code Division Multiple Access (CDMA) method and which improves a characteristic of interference cancellation at the time of multi-path propagation, and also relates to a method for the same.

BACKGROUND OF THE INVENTION

In the CDMA method, communications can be performed based on a system that all users simultaneously share the same frequency band using different spread codes assigned to the users. However, due to a cross correlation between spread codes assigned to different users, the signal of one user works as an interference signal to another users. The degree of cross interference becomes higher in association with an increase in the number of users. This degrades the reception characteristic. As a method for overcoming this problem, a multistage serial interference canceller system (henceforth, a serial interference canceller system) is conventionally known.

In the serial interference canceller system the reception characteristic is improved by enhancing the signal-power to interference-power ratio (SIR) for users for the following processing. Precisely, in this method, transmission data is temporarily determined in decreasing order of its received power, a replica of the interference signal is generated in the reception side based on the temporarily determined data. Finally, the interference-signal replica is subtracted from the incoming signal.

In this method, it is required that the above mentioned operation is repeated by times corresponding to the number of users in order to reduce the influence exerted on interference cancellation by an error in temporary determination and a remaining interference component. Accordingly, this method is referred to as a serial interference canceller. This serial interference canceller is required to perform channel estimation with high accuracy in order to reproduce the replica of the interference signal. Accordingly, a frame structure obtained by inserting a pilot symbol in the information is employed. The operation of estimating a channel using this frame structure is also repeated by times corresponding to the number of users. Thus, the degree of accuracy of channel estimation is improved by successively performing channel estimation in each stage.

FIG. 16 and FIG. 17 show a CDMA reception system applying a conventional serial canceller, that is, an interference cancellation device disclosed in Technical Report of IEICE RCS95-50, the institute of electronics, information and communication engineers as an example. This conventional CDMA reception system comprises, a sorting circuit 3; an interference cancellation device having K (natural number) number of blocks of a first stage to a final stage 4, 5 to 6, (K−1) units of delay circuits 7, 8 . . . , K units of matched filters (MF) 20A1 to 20AK, and K units of level detectors 21A1 to 21AK; a decoder 9; SIR measurement block 10; and TPC bit generator 11.

The sorting circuit 3 determines the ranking of the users (#1 to #K) in descending order of the incoming signal level and thus sorts the users. The first to the final stages 4, 5 to

6, which are serially connected to generate replicas of interference signals based on the incoming signals, sequentially execute interference cancellation according to the ranking of the users. The delay circuits 7, 8 . . . delay the incoming signals by a time equivalent to the processing time for generating replicas of interference signals required up to the previous stage when the incoming signals are to be output to the second stage 5 and the stages from then on. The decoder 9 de-interleaves and Viterbi-decodes based on data judged values DJ1 to DJK output from the final stage 6.

The SIR measurement block 10 measures the SIR based on respective data judged values DJ1 to DJK output from the final stage 6. The TPC bit generator 11 determines a TPC bit value based on the result of respective judgements in the SIR measurement block 10 and a previously provided target SIR. The TPC bit mentioned here indicates data transmitted to a mobile station on downlink transmission signals. The matched filters 20A1 to 20AK detect correlation values for users from the incoming signals. The level detectors 21A1 to 21AK detect the levels of the incoming signals based on the correlation values for each user detected in the matched filters 20A1 to 20AK, and outputs the detected levels to the sorting circuit 3 in the following stage.

The first stage 4 comprises delay circuits 4A2, 4A3 to 4AK, subtracters 4B2, 4B3 to 4BK, and first to K-th processing units 4C1, 4C2 to 4CK. Each of the delay circuits 4A2, 4A3 to 4AK receives the incoming signal as an error signal as it is, and delays this signal for a time equivalent to the processing time required for generating all the replicas of the interference signals for users whose processing sequence is preceded in the same stage. Each of the subtracters 4B2, 4B3 to 4BK subtracts all the replicas of interference signals for the users whose processing sequence is preceded, except a relevant user, from the output (delayed incoming signal) of the delay circuit in the previous stage for output.

Each of the first to K-th processing units 4C1, 4C2 to 4CK restores the replica of the interference signal by performing inverse spread, channel estimation by a pilot symbol, RAKE synthesis, and identification based on received user signals ranked in descending order of the level of the incoming signal. Output (replica of the interference signal) of each of the first to K-th processing units 4C1, 4C2 to 4CK is supplied to all the subtracters that require the replica of the interference signal, of the subtracters associated with users whose processing sequence is delayed, not only in the same stage but also the following stages.

FIG. 18 shows a frame structure of the incoming signal obtained by inserting a pilot symbol in the information. One frame of the incoming signal consists of a pilot symbol, a TPC symbol, and a data symbol. One pilot block is structured by adding the pilot symbol at the head position of the following block to the frame. The range of the block includes variations frontward or backward due to phase shift as shown in FIG. 18.

Operation of the CDMA reception system is explained below. FIG. 16 and FIG. 17 show the case in which the number of users is K (natural number). The incoming signal is input into each of the matched filters 20A1 to 20AK corresponding to each user. The matched filters 20A1 to 20AK obtain correlation values by users, and the level detectors 21A1 to 21AK in the following stage measure the respective levels of the incoming signals for each user. These level detectors 21A1 to 21AK output the results of measured received signal level for each user to the sorting circuit 3. The sorting circuit 3 sorts the incoming signals in descending order based on the level the of incoming signals, and temporarily determines transmission data in that order.

An interference cancellation section formed by the plurality of stages (first stage 4 to final stage 6) is serially connected to the sorting circuit 3 in its downstream side, and interference cancellation is sequentially executed in each of the stages. Interference cancellation is started in the first stage 4. In this first stage 4, the first processing unit 4C1 is allocated to the processing for a user signal (the incoming signal) with the highest signal level. When this user signal is input into the first processing unit 4C1, inverse spread, channel estimation by its pilot symbol, RAKE synthesis, and identification and judgement are performed in the unit.

The judgement value obtained in this manner is spread again in each path using an estimated value of variation in a transmission path, and the replica of an interference signal for any user signal whose incoming signal level is the highest is generated. This interference-signal replica is supplied, as output of the first processing unit 4C1, to all of the other processing units 4C2 to 4CK that are to perform the following processing in the same stage. In this manner, the replica of the interference signal, that is output from the first processing unit 4C1, is used for generating the replica of an interference signal for any user signal whose incoming signal level is lower than this user signal. During generation of replicas, this replica is also used for generating the replica of the interference signal from the incoming signal for some other user.

A relation between the pilot symbol used for channel estimation and the data symbol is explained below. In each of the stages 4, 5 to 6, interference cancellation and generation of the replica of the interference signal are performed in each pilot block (see FIG. 18). A reception-fading complex envelope in each location of data symbols can be obtained by interpolating estimated reception-fading complex envelopes in pilot symbols for the data symbol between the pilot symbols, and extrapolating an estimated reception-fading complex envelope in a pilot symbol for the data symbol outside the pilot symbol. The second processing unit 4C2 in the first stage 4 is allocated to any user whose incoming signal level is the second highest in the same manner as explained above.

The incoming signal is delayed in the delay circuit 4A2 for a time equivalent to the processing time in the first processing unit 4C1. The subtracted 4B2 subtracts the replica of the interference signal for the first user obtained in the first processing unit 4C1 is then subtracted from the incoming delayed in signal. The output of the subtracter 4B2 is input into the second processing unit 4C2. The second processing unit 4C2 performs the same processing as that of the first processing unit 4C1 and outputs the replica of the interference signal for the second user.

The third processing unit 4C3 in the first stage is allocated to any user whose incoming signal level is the third highest. In the case of this third user, the incoming signal is delayed in the delay circuit 4A3 for a time equivalent to that required for the processing in the first and second processing units 4C1 and 4C2. The replica of the interference signal for the first user and the replica of the interference signal for the second user are subtracted from the delayed incoming signal in the subtracter 4B3. The result of the computation is input into the third processing unit 4C3. The same processing as that in the first and second processing units 4C1 and 4C2 is performed in the third processing unit 4C3 and the replica of the interference signal for the third user is then output. By repeating such operation up to the K-th user, the processing for generating replicas of the interference signals in the processing units 4C1 to 4CK corresponding to all the users is completed in the first stage.

In the second stage 5, the processing for generating replicas of interference signals of the incoming signals for all users is performed again. The incoming signal is supplied to the second stage 5 after delaying in the delay circuit 7 for a time equivalent to that required for the processing in the first stage 4. The replicas of the interference signals for the second user, the third user to the K-th user in the first stage 4 are subtracted from the received signal (received pilot block) in a subtracter 5B1 provided downstream from the delay circuit 7. The result of the computation is input into a first processing unit 5C1. The same processing as that in each processing unit of the first stage 4 is performed in the first processing unit 5C1 and the interference-signal replica for the first user in the second stage 5 is then output.

The incoming signal delayed in the delay circuit 7 is further delayed in a delay circuit 5A2 for a time equivalent to that required for the processing in the first processing unit 5C1 and is input into a subtracter 5B2 in the second stage 5. The replicas of the interference signals for the third user to the K-th user in the first stage 4 and the replica of the interference signal for the first user in the second stage 5 are then subtracted from the delayed incoming signal. The result of the computation is input into a second processing unit 5C2, and an interference-signal replica for the second user in the second stage 5 is generated.

A third processing unit 5C3 in the second stage 5 is allocated to a third user. In the case of this third user, the incoming signal is delayed in a delay circuit 5A3 for a time equivalent to that required for the processing in the first and second processing units 5C1 and 5C2. The interference-signal replica for the first user and the interference-signal replica for the second user are subtracted from the delayed incoming signal in a subtracter 5B3. The result of the computation is input into the third processing unit 5C3. The same processing as that in the first and second processing unit 5C1 and 5C2 is performed in the third processing unit 5C3, and the interference-signal replica for the third user is output. By repeating the same operation up to the K-th user, the processing for generating replicas of interference signals in the first to K-th processing units 5C1 to 5CK corresponding to all the users is completed in the second stage 5.

The same processing as in the second stage is performed in each stage after the second stage and on except the final stage. Therefore, the processing in the final stage will only be explained here with reference to FIG. 17. The processing for generating replicas of interference signals with respect to incoming signals for all the users are performed again in the final stage 6. The incoming signal is delayed for a time equivalent to that required for all the processing in the first to K-th stages in the delay circuits 7, 8 . . . (K−1), and is supplied to the final stage 6. The replicas of interference signals for all the users except the first user are subtracted from the incoming signal (received pilot block) delayed in the previous stage in a subtracter 6B1 of the final stage 6. The result of the computation is input into a first processing unit 6C1. The same processing as that in each of the processing units is performed in the first processing unit 6C1 and then the interference-signal replica for the first user is output in the final stage 6.

The delayed incoming signal in the previous stage is further delayed in a delay circuit 6A2 for a time equivalent to that required for the processing in the first processing unit 6C1 and input into a subtracter 6B2 of the final stage 6. The replicas of the interference signals for all the users except the second user are then subtracted from the delayed incoming signal. The result of the computation is input into a second processing unit 6C2, and an interference-signal replica for the second user in the final stage 6 is generated.

A third processing unit 6C3 in the final stage 6 is allocated to a third user. In the case of this third user, the incoming signal is delayed in a delay circuit 6A3 for a time equivalent to that required for the processing in the first and second processing units 6C1 and 6C2. The replicas of the interference signals for all the users except the third user are subtracted from the delayed incoming signal in a subtracter 6B3. The result of the computation is input into the third processing unit 6C3. The same processing as that in the first and the second processing units 6C1 and 6C2 is performed in the third processing unit 6C3, and the interference-signal replica for the third user is output. By repeating the same operation up to the K-th user, the processing for generating replicas of interference signals in the first to K-th processing units 6C1 to 6CK corresponding to all the users is completed in the final stage 6.

Thus, the reception characteristic is improved in each stage by subtracting the replicas of the interference signals for the other users, that have been generated in the previous stages, from the incoming signal. According, the degree of accuracy of channel estimation becomes higher as the processing approaches the final stage. Therefore, output with the highest degree of accuracy in channel estimation, that is, the judgement values DJ1 to DJK after interference cancellation is processed, are obtained in the final stage 6. The decoder 9 and the SIR measurement block 10 are connected to the final stage 6. The data is subjected to the processing for de-interleave and Viterbi decoding in the decoder 9 based on the judgement values DJ1 to DJK for respective users output from the final stage 6 to obtain decoded data.

These judgement values DJ1 to DJK are also supplied to the SIR measurement block 10, and SIR of the incoming signal for every user is measured based on the judgement values DJ1 to DJK for that particular user. The SIR for each user measured in the SIR measurement block 10 is output to the TPC bit generator 11, and the SIR measured in the SIR measuring device 10 is compared with the previously provided target SIR. As a result, TPC bit, that instructs to step down transmission power in a mobile station, is generated for any user with the measured SIR higher than the target SIR, whereas TPC bit, that instructs to step up transmission power in a mobile station, is generated for any user with the measured SIR lower than the target SIR. The TPC bit for every user produced in this manner is transmitted to the relevant mobile station on the downlink transmission signal. The processing is executed in each pilot block.

Since the conventional interference cancellation device is configured as explained above, the effect of interference cancellation by the serial interference canceller is dependent on for which user the processing for inverse spread, channel estimation, and generation of an interference-signal replica is first performed in the stages 4, 5, . . . 6 shown in FIG. 16 and FIG. 17. Therefore, conventionally, in order to obtain the sequence, incoming signal power for all users is measured prior to the processing in each stage, a user with the highest power is ranked first, and the sequence is determined according to the measured signal power.

On the other hand, SIR used for controlling transmission power is measured based on the result of determination of a incoming signal for each user after all the processing for interference cancellation is finished. Thus, the device for measurement of the signal power is utilized just for determining the sequence. However, if this device is used only for determining the sequence, then there arises a problems that a lot of time is required for the measurement of power and the ranking process. As a consequence a delay is generated in data demodulation, the scale of hardware becomes larger so that power consumption becomes larger, and so forth. Further, as shown in FIG. 16 and FIG. 17, the power measurement block is formed with the matched filters 20A1 to 20AK and the level detectors 21A1 to 21AK. Therefore, there has been a concern that cross interference between users may cause a greater measurement error in measurement of incoming signal power.

SUMMARY OF THE INVENTION

It is an object of this invention to obtain an interference cancellation apparatus applied in the CDMA communication system that can shorten the computing time for ranking processing and also reduce the scale of hardware and power consumption, and further to obtain a method for the same.

According to one aspect of this invention, when transmission rate information for every user is known, rank of the users is determined based on this transmission rate information. Thus, there is no need to provide a device that measures the incoming signal power. Accordingly, it is possible to shorten the computing time for ranking processing and also reduce the scale of hardware and power consumption.

According to another aspect of this invention, when transmission rate information and required quality information for every user is known, rank of users is determined based on both the transmission rate information and the required quality information. Therefore, there is no need to provide a device that measures incoming signal power. Accordingly, it is possible to shorten the computing time for ranking processing and also reduce the scale of hardware and power consumption.

According to still another aspect of this invention, when transmission rate information for the users is unknown, interference cancellation is performed by at least a number of stages corresponding to a number of users based on ranking arbitrarily given in each of the stages. Further, the transmission rate information is detected and arbitrary ranking to be used in the next stage is updated based on the respective transmission rate information detected in each stage. Therefore, even if the transmission rate information is unknown there is no need to provide a device that measures the incoming signal power. Accordingly, it is possible to shorten the computing time for ranking processing and also reduce the scale of hardware and power consumption.

According to still another aspect of this invention, when transmission rate information for the users is unknown, interference cancellation is performed by at least a number of stages corresponding to a number of users based on ranking arbitrarily given in each of the stages. Further, the transmission rate information is detected and arbitrary ranking to be used in the next stage is updated based on the respective transmission rate information detected in each stage and known required quality information. Therefore, even if the transmission rate information is unknown there is no need to provide a device that measures the incoming signal power. Accordingly, it is possible to shorten the computing time for ranking processing and also reduce the scale of hardware and power consumption.

According to still another aspect of this invention, when the transmission rate information for some users is known but for other users is unknown, interference cancellation is performed by at least a number of stages corresponding to a number of users based on ranking arbitrarily given in each of the stages. Further, the transmission rate information is detected and for the users whose transmission rate information is known, rank of the users is determined based on this transmission rate information. On the other hand, for the users whose transmission rate information is unknown, arbitrary ranking to be used in the next stage is updated based on the transmission rate information detected in each stage. Therefore, irrespective of whether the transmission rate information is known or unknown there is no need to provide a device that measures the incoming signal power. Accordingly, it is possible to shorten the computing time for ranking processing and also reduce the scale of hardware and power consumption.

According to still another aspect of this invention, when the transmission rate information for some users is known but for other users is unknown, interference cancellation is performed by at least a number of stages corresponding to a number of users based on ranking arbitrarily given in each of the stages. Further, the transmission rate information is detected and for the users whose transmission rate information is known, rank of the users is determined based on this transmission rate information and known required quality information. On the other hand, for the users whose transmission rate information is unknown, arbitrary ranking to be used in the next stage is updated based on the transmission rate information detected in each stage and the known required quality information. Therefore, irrespective of whether the transmission rate information is known or unknown there is no need to provide a device that measures the incoming signal power. Accordingly, it is possible to shorten the computing time for ranking processing and also reduce the scale of hardware and power consumption.

Further, incoming signal power is estimated based on a value obtained by multiplication of known transmission rate information and known required quality information user. The rank of the user is determined from the power estimated in this manner. Therefore, the quality of the signal can be improved.

Further, incoming signal power is estimated based on a value obtained by multiplication of known transmission rate information and known required quality information user. The rank of the user is updated based on the power estimated in this manner. Therefore, the quality of the signal can be improved in each stage.

Further, the last obtained rank is used for the interference cancellation in the first stage. Therefore, required interference cancellation can be realized without much difference in the rankings.

Further, when there is a user whose ordinal rank is not stored in the last process, the rank of this user is determined as the highest one. Therefore, required interference cancellation can be realized without omission of ranking for any user.

Further, in an interference cancellation apparatus which enables determination and updating of rank, the last obtained rank is used for interference cancellation in the first stage. Therefore, required interference cancellation can be realized without much difference in the rankings.

Further, in the first stage, when transmission rate information is known, interference cancellation is performed by selecting the determined rank. On the other hand, when transmission rate information is unknown, interference cancellation is performed by selecting the last obtained ranking. Therefore, required interference cancellation can be realized using the most adequate ranking as necessary.

Further, in an interference cancellation apparatus which enables determination and updating of ranking, when there is a user whose ordinal rank is not stored in the last process, the rank of this user is determined as the highest one. Therefore, required interference cancellation can be realized without omission of ranking for any user.

Further, when any signal on which transmission power control is not executed is received, rank is determined user by user based on the level of the incoming signal. Therefore, with regard to any signal, at least, whose transmission power is controlled, the processing for measuring power of the received signal is eliminated. Accordingly, it is possible to shorten the computing time for ranking processing and also reduce power consumption.

According to still another aspect of this invention, when transmission rate information by user is known, there includes a step of determining rank of the users based on the known transmission rate information by user and known required quality information Therefore, the processing for measuring the incoming signal power is eliminated. Accordingly, it is possible to shorten the computing time for ranking processing.

According to still another aspect of this invention, when transmission rate information by user is unknown, there includes a step of performing interference cancellation by at least a number of stages corresponding to a number of users based on ranking arbitrarily given in each of the stages. Further, the transmission rate information is detected and arbitrary ranking to be used in the next stage is updated based on the transmission rate information detected in each step and known required quality information. Therefore, even if the transmission rate information by user is unknown there is no need to measure the incoming signal power. Accordingly, it is possible to shorten the computing time for ranking processing.

According to still another aspect of this invention, when transmission rate information is known for some users and known for the other users, there includes a step of performing interference cancellation by at least a number of stages corresponding to a number of users based on ranking arbitrarily given in each of the stages. Further, transmission rate information is detected and for the users whose transmission rate information is known, there includes a step of determining ranking between the users based on the known transmission rate information by user and known required quality information. On the other hand, for the users whose transmission rate information is unknown, arbitrary ranking to be used in the next stage is updated based on the transmission rate information detected in each stage and the known required quality information. Therefore, irrespective of whether the transmission rate information there is no need to measure the incoming signal power is known or unknown. Accordingly, it is possible to shorten the computing time for ranking processing.

Other objects and features of this invention will become apparent from the following description with reference to the accompanying drawings.

DESCRIPTION OF THE PREFERRED EMBODIMENTS

Preferred embodiments of the interference cancellation apparatus applied in the CDMA communication system and the method for the same according to the present invention are explained below with reference to the attached drawings.

Figure 1:
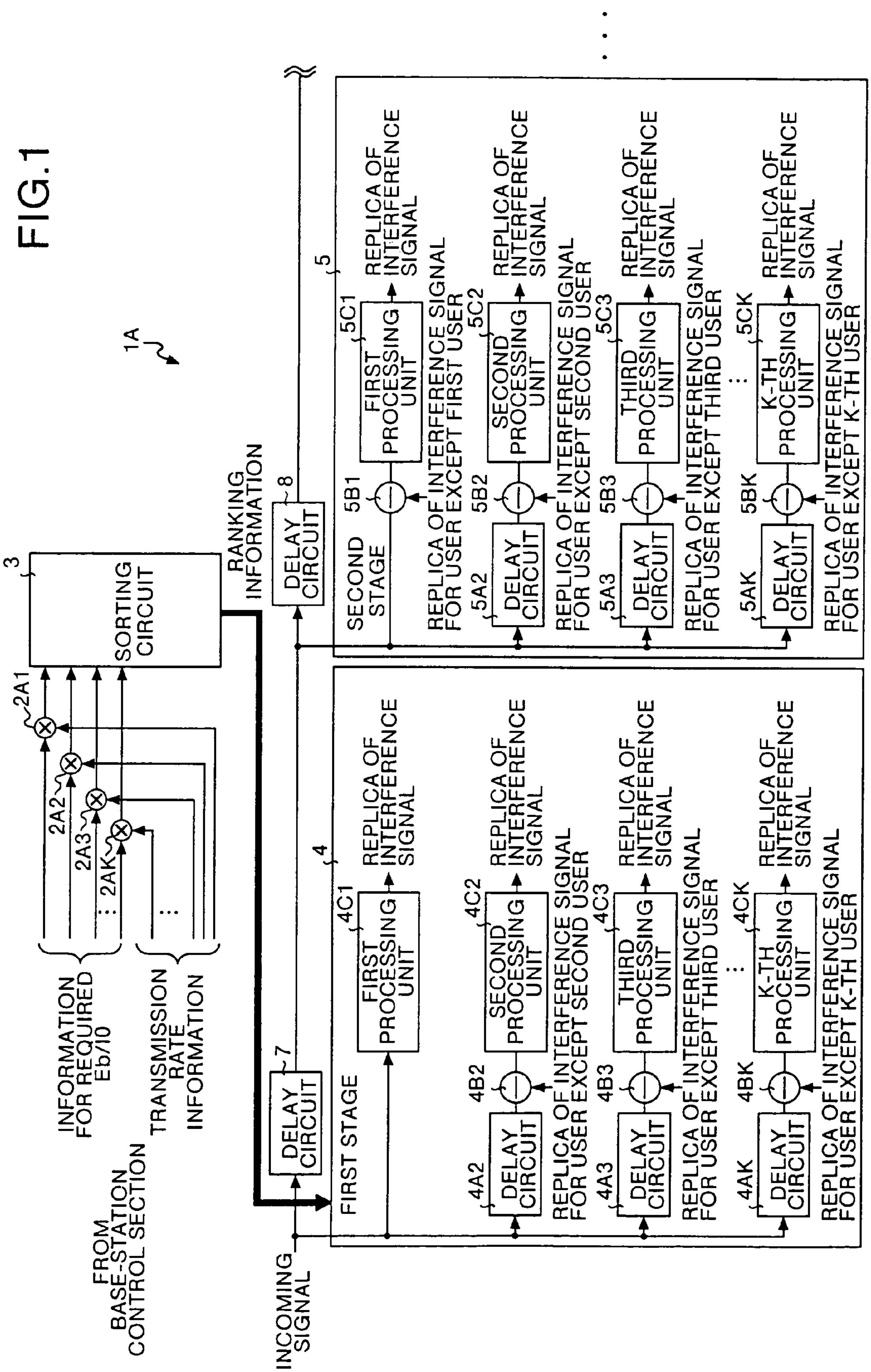
FIG. 1 is a portion of a block diagram showing an example of the configuration of the CDMA reception system in which an interference cancellation apparatus according to a first embodiment of this invention is applied.
Figure 2:
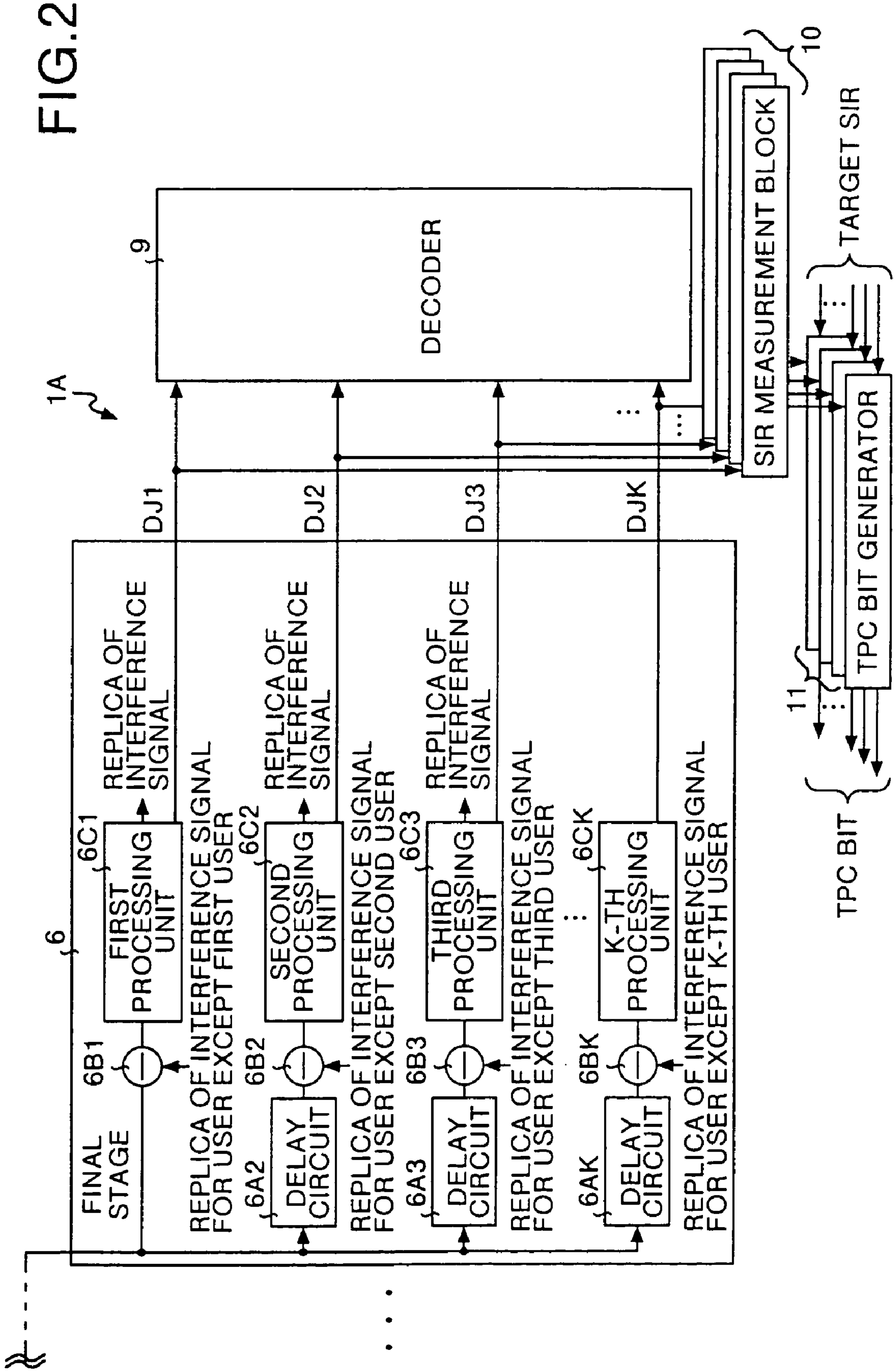
FIG. 2 is the remaining portion of the block diagram the CDMA reception system shown in FIG. 1.

It will be assumed here that the number of users is K, which is the same as the conventional case. FIG. 1 and FIG. 2 show block diagrams of the configuration an example of a CDMA reception system in which the interference cancellation apparatus according to the first embodiment of this invention is applied. The CDMA communication system 1A comprises multipliers 2A1 to 2AK; the sorting circuit 3; the interference cancellation apparatus having K (natural number) number of blocks of a first stage to final stages 4, 5 to 6, and (K-1) units of delay circuits 7, 8 . . . the decoder 9; the SIR measurement block 10; and the TPC bit generator 11.

Figure 16:
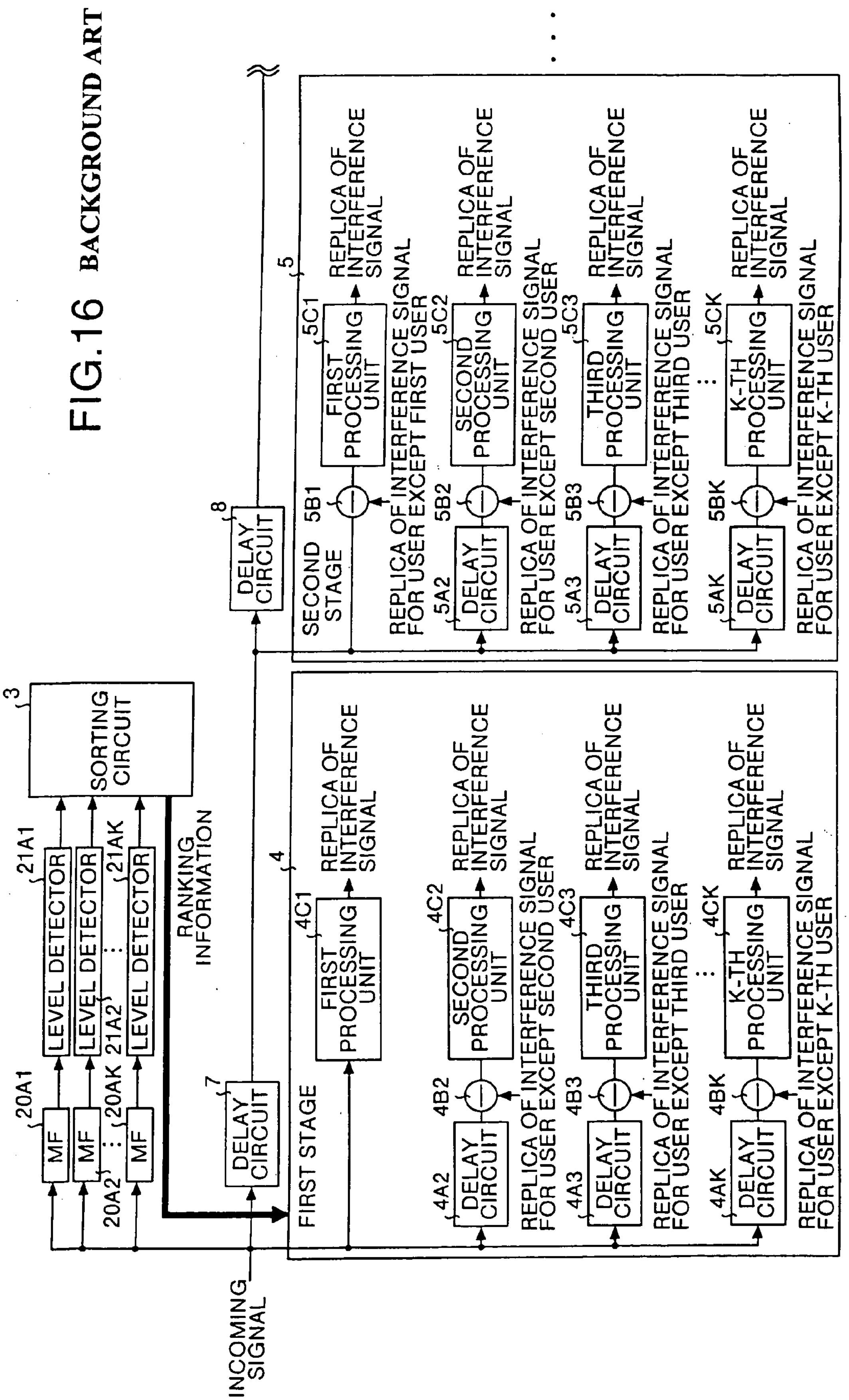
FIG. 16 is a portion of a block diagram showing an example of the configuration of the CDMA reception system in which the conventional interference cancellation apparatus is applied.
Figure 17:
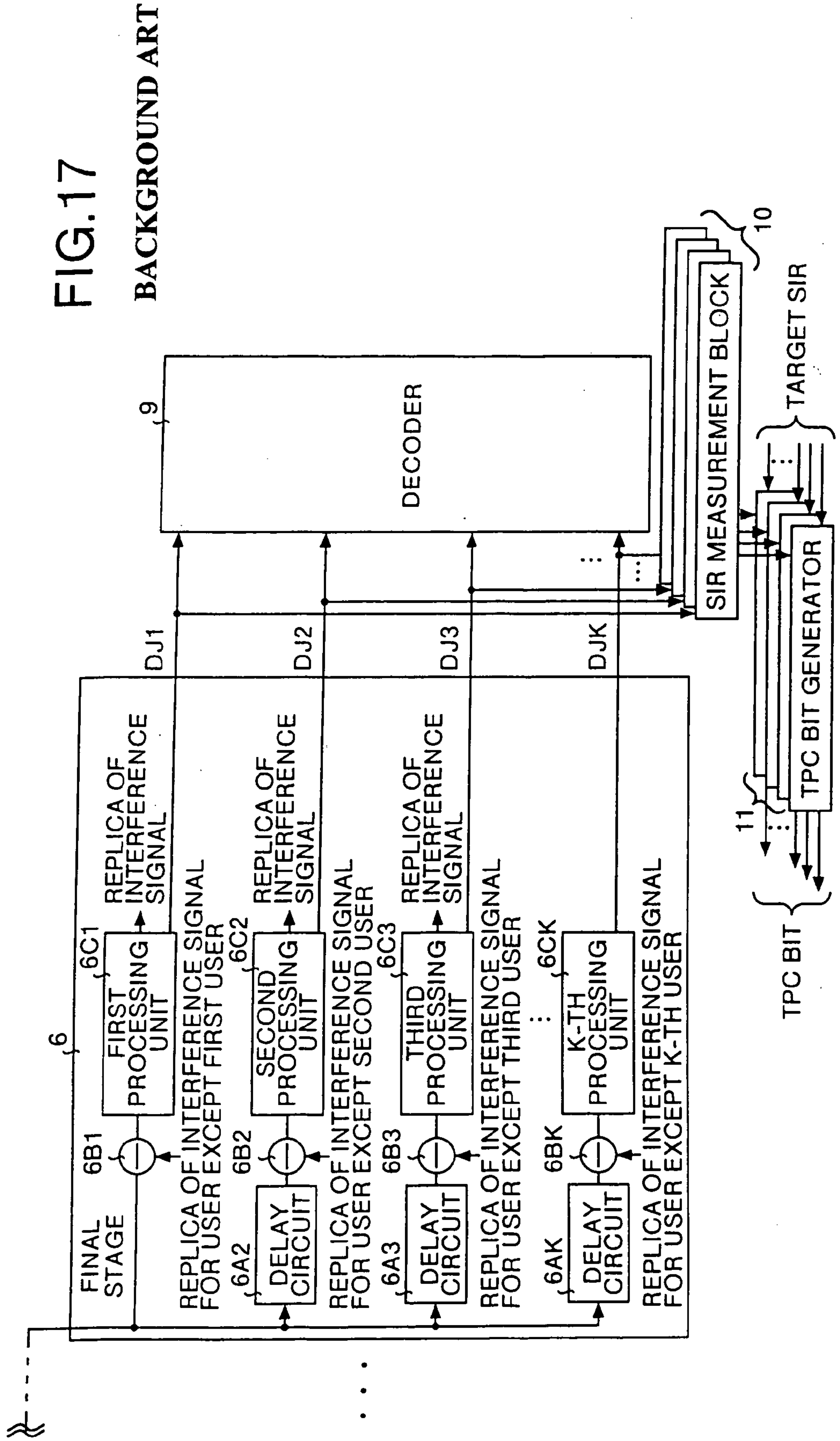
FIG. 17 is the remaining portion of the block diagram of the CDMA reception system shown in FIG. 16.
Figure 18:
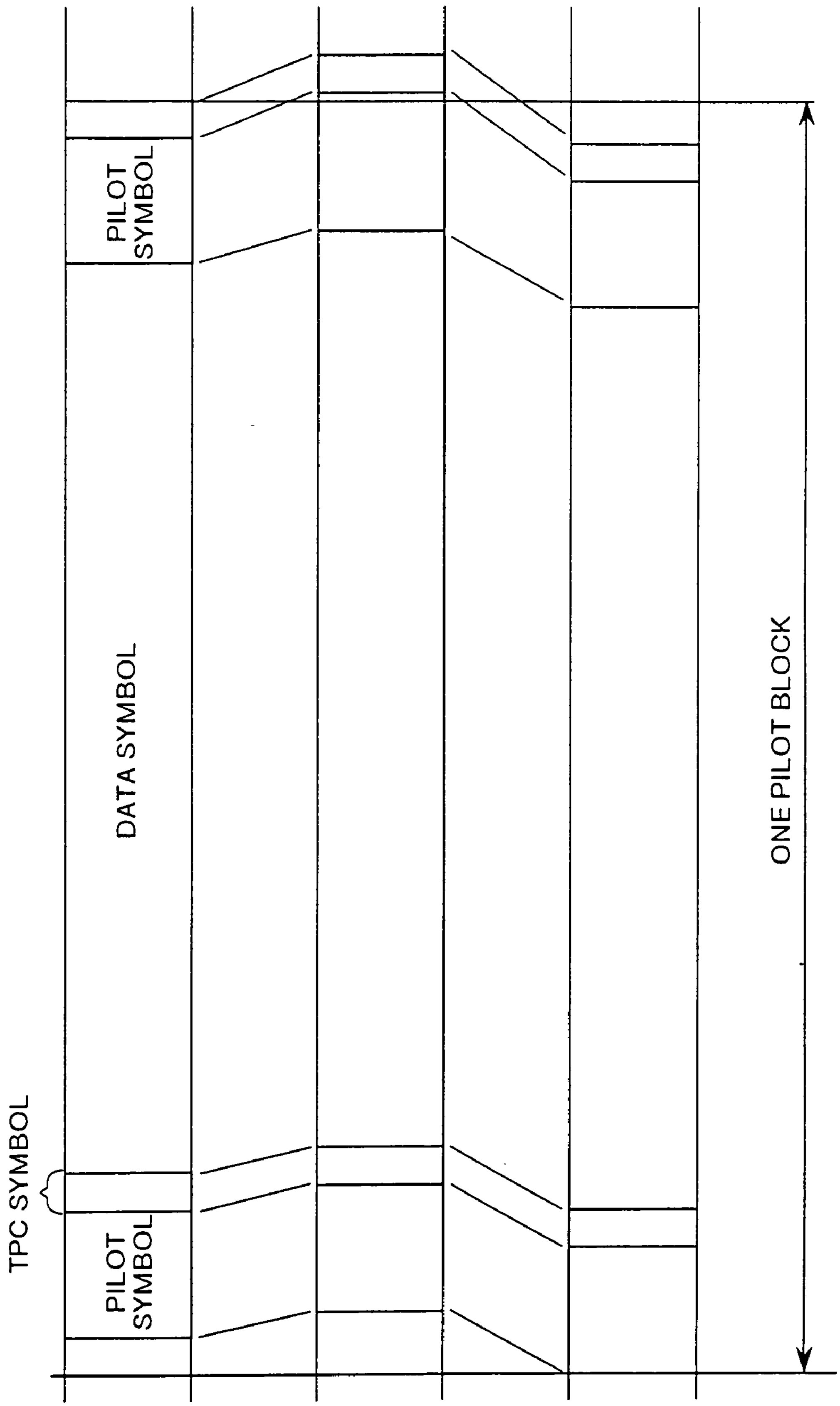
FIG. 18 shows a pilot block.

The difference between the CDMA communication system 1A and the conventional CDMA communication system shown in FIG. 16 and FIG. 17 is that the multipliers 2A1 to 2AK are provided in place of the device for measuring the incoming signal power measurement block comprising the matched filters 20A1 to 20AK and the level detectors 21A1 to 21AK. Multipliers 2A1 to 2AK are connected to a base-station control section, which is not shown in the figure. Each of these multipliers 2A1 to 2AK is supplied from the base-station control section with known required Eb/I0 (corresponding to an S/N ratio for 1 bit of information) representing required quality and transmission rate information preset for each user. Each of the multipliers 2A1 to 2AK then multiplies information for required Eb/I0 by transmission rate information user by user, and outputs the result of the computation to the sorting circuit 3. The required Eb/I0 mentioned here means Eb/I0 required for making a data error or a frame error less than specifications.

The CDMA communication system 1A has the same configuration as that of the conventional system except the configuration (multipliers 2A1 to 2AK) provided upstream from the sorting circuit 3, therefore, explanation of the same configuration is omitted.

Operation of the CDMA communication system 1A will be explained below. Processes that are similar to the conventional will be explained only in short. Prior to communications, data transaction required for the communications is performed between a base station not shown and mobile stations corresponding to the number of users K. During this process, respective transmission rate information for users is transmitted to the base station. Thus, the transmission rate information of the signal input into this CDMA communication system 1A is known. It is assumed that the known transmission rate information is the one that does not change during the communications. On the other hand, unknown transmission rate information is the one that changes when image data is sent and when voice data is sent, or similar cases.

The transmission rate information acquired by the base-station control section in the initial stage of the communications and information for required Eb/10 previously determined are output to the multipliers 2A1 to 2AK. The multipliers 2A1 to 2AK calculate [required Eb/I0]×[transmission rate] user by user based on the input transmission rate information and the information for required Eb/10. The respective results of computation are output user by user to the sorting circuit 3. The sorting circuit 3 estimates the incoming power from the result of computation to determine ranking of users in decreasing order of a user having signal power with the highest level, as already explained in the conventional case.

The processing for channel estimation and generation of the replica of an interference signal for each user is executed in the first stage based on the ranking information obtained as explained above. The same processing as that of the stage 4 is executed in the second stage 5 to the final stage 6. The sequence of temporarily determining data for each user in each stage is the same as that of the conventional case. Therefore, explanation of the sequence will be omitted.

The difference between the conventional operation is that, when Eb/I0 at the time of demodulation is controlled so as to be a target value through transmission power control, the power of a corresponding input user signal is obtained from [required Eb/I0]×[transmission rate] under the ideal transmission power control. Therefore, if the required Eb/10 and the transmission rate information are known, the incoming signal power can be estimated within a range of error in the transmission power control.

The level of the power is estimated to be same for the users having the same required Eb/10 and the same transmission rate information of signals, but ranking between user signals with the same power is performed randomly. Because of the feature of interference cancellation, an error in measurement of power due to cross interference may be included in ranking even when the configuration has a power measurement system. Therefore, a slight difference does not cause decisive degradation if the levels are almost the same, and it is within an allowable range.

Figure 3:
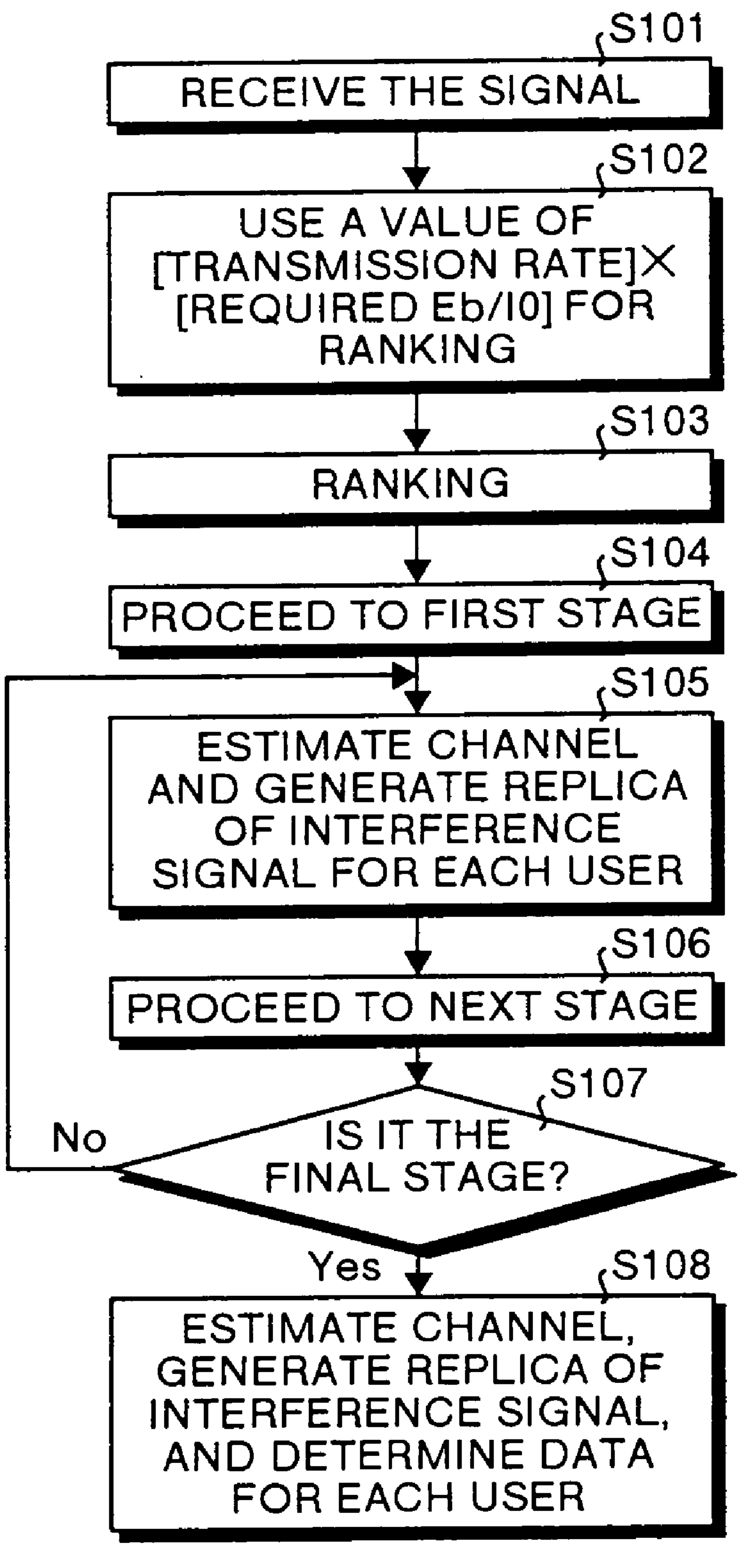
FIG. 3 is a flow chart showing the operation according to the first embodiment.

The overall operation is functionally explained below. FIG. 3 is a flow chart functionally showing the operation of the first embodiment. When an incoming signal is received at step S101, the value of [required Eb/I0]×[transmission rate] is obtained for each user at step S102. At step S103, ranking processing is performed. The sequence of user signals is determined in descending order of this ranking from the result of computation at step S102. At step S104, the processing shifts to the first stage 4, and at step S105, the processing for channel estimation and generation of the replica of an interference signal for each user is performed.

Further, at step S106, the processing shifts to the next stage. That is, the second stage 5. In the second stage 5, the processing for channel estimation and generation of the replica of an interference signal for each user is also performed in the same manner as that of the first stage 4. The process from step S105 to step S107 is repeated for all the stage except the final stage. When it is confirmed that the process the final stage 6 at step S107, the process does not return to step S105 but proceeds to step S108. At step S108, channel estimation and generation of the replica of the interference signal for each user are executed, and data is finally judged. As a result, judgement values DJ1 to DJK for each user are obtained.

According to the first embodiment as explained above, when the required Eb/10 and the transmission rate information of the incoming signal are known, ranking is performed based on a value of [required Eb/I0]×[transmission rate], therefore, there is no need to provide a device for measuring the incoming signal power. Accordingly, the computing time for ranking can be shortened, and also the scale of hardware and power consumption can be reduced. Further since a device for measurement of incoming signal power is not provided, ranking can be performed without an error in measurement of received signal power due to cross interference between users.

The processing for determination of a rank of a used when the required Eb/10 and the transmission rate information are known is explained in the first embodiment. However, the present invention is not limited to this case. That is, rank may be determined if required Eb/10 is known but the transmission rate information is unknown. This case is explained below as a second embodiment.

Figure 4:
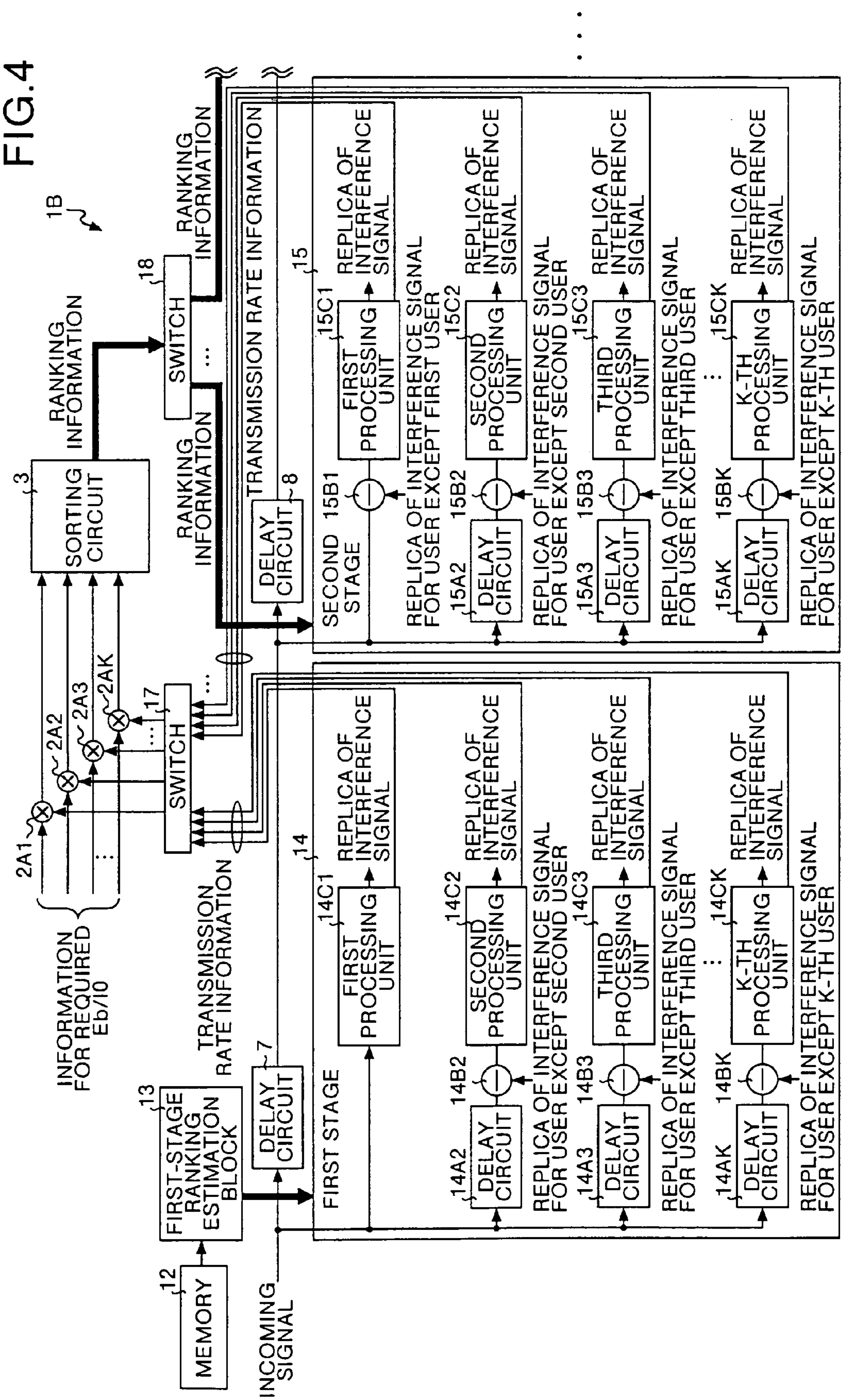
FIG. 4 is a portion of a block diagram showing an example of the configuration of a CDMA reception system in which an interference cancellation apparatus according to a second embodiment of this invention is applied.
Figure 5:
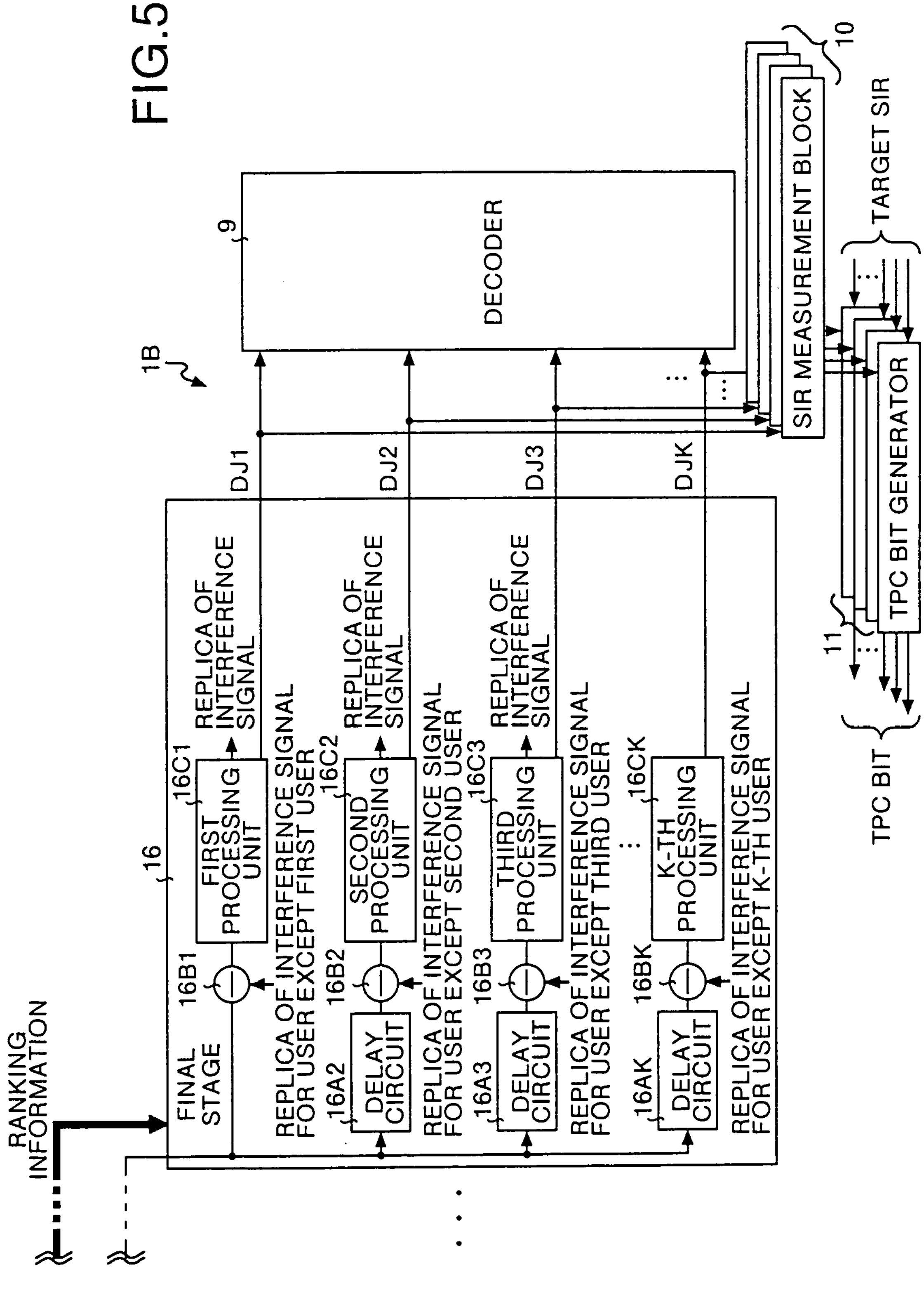
FIG. 5 is the remaining portion of the block diagram of the CDMA reception system shown in FIG. 4.

The number of users is assumed to be K. FIG. 4 and FIG. 5 are block diagrams showing an example of the configuration of a CDMA reception system in which an interference cancellation apparatus according to the second embodiment of this invention is applied. The CDMA reception system 1B comprises the multipliers 2A1 to 2AK; the sorting circuit 3; an interference cancellation apparatus having K (natural number) number of blocks of a first stage to a final stage 14, 15 to 16, (K-1) units of delay circuits 7, 8, switches 17 and 18; the decoder 9; the SIR measurement block 10; and the TPC bit generator 11.

It is necessary to internally generate transmission rate information in the interference cancellation apparatus of the CDMA reception system 1B because the transmission rate information is unknown. The difference between the CDMA reception system of the first embodiment and the second embodiment is as follows. That is, the multipliers 2A1 to 2AK are configured not to receive respective transmission rate information from the not base-station control section but receive the transmission rate information for respective following stages from the immediately preceding stages of the first stage 14, the second stage 15, . . . the final stage 16 via the switch 17. The switch 17 is connected between each input of the multipliers 2A1 to 2AK and each output of the stages 14, 15 to 16, and selects one of input sources of the multipliers 2A1 to 2AK as required matching the processing in each stage. Further, the switch 18 is connected between an output of the sorting circuit 3 and each input of the stages 14, 15 to 16, and selects one of target outputs of the sorting circuit 3 as required matching the processing in each stage.

Further, a ranking estimation block 13 for the first stage is connected to the first stage 14 as a temporary ranking information provider. This first-stage ranking estimation block 13 estimates ranking by referring to the ranking information stored in memory 12, and provides the ranking information to the first stage 14 as temporary ranking information. The memory 12 stores the history of ranking information obtained each time transmission power is controlled, for each pilot block.

Since the second embodiment has a configuration that ranking to be used in the following stage is determined by the transmission rate information obtained in the previous stage, the configuration of the first stage 14, and the stages 15 to 16 are partially different from that of the first stage 4, and the stages 5 to 6. The first stage 14 comprises delay circuits 14A2, 14A3 to 14AK, subtracters 14B2, 14B3 to 14BK, and first to K-th processing units 14C1 and 14C2 to 14CK. The delay circuits 14A2, 14A3 to 14AK and the subtracters 14B2, 14B3 to 14BK perform similar functions to the corresponding ones in the conventional case, therefore, explanation of these components will be omitted. In the first to K-th processing units 14C1, 14C2 to 14CK, the processing for reproducing the replica of an interference signal is the same as that of the first embodiment. However, the point, that transmission rate information is detected based on the incoming signal and the detected information is output to the switch 17, is different from the first embodiment.

The second stage 15 to the final stage 16 are the same as the first stage 14, therefore, explanation of these blocks is omitted. Legends in FIG. 4 are represented by adding 10 to the numbers of the first embodiment. Especially, the first to K-th processing units 16C1, 16C2 to 16CK in the final stage 16 do not detect transmission rate information. This is because there is no following stage and it is not required to judge ranking using the transmission rate information.

Since the configuration of the CDMA reception system 1B is the same as that of the conventional system, apart from the difference between the first embodiment and the conventional system and the difference between this system and that of the first embodiment. Therefore, explanation of the same configuration is omitted.

Operation of the CDMA reception system 1B is explained below. Operations that are similar to the conventional case will be explained only in short. Since transmission rate information of a user is unknown in the first stage 14, it is impossible to obtain accurate ranking from the input signal. The ranking in this stage is estimated in the first-stage ranking estimation block 13. In this first-stage ranking estimation block 13, the ranking information stored in the memory 12 is used for any user signal that has the ranking information for the last pilot block. Whereas, the highest ranking is given to any user signal that has no such ranking information because the signal may have maximum power.

Each of the first to K-th processing units 14C1 to 14CK of the first stage 14 performs channel estimation and generation of the replica of an interference signal for each user according to the ranking determined as explained above, and at the same time detects transmission rate information included in a data symbol in each user signal. There are cases in which transmission rate information is included in a not-coded part and in which the information is detected through blind detection. The blind detection is disclosed in Electronic Letters (Vol. 32, No. 20, September, 1996) as Document 1 and also in National Conference of IEICE (Society Conference B-5-43, 1997) as Document 2.

In Document 1, there is disclosed a method for using an error detection code when intermittent transmission is executed by changing a number of symbols to be transmitted at the time of transmitting bits not more than the maximum number of frame bits,. In Document 2, on the other hand, when successive transmission is executed with low power by repeating symbols, there is disclosed a method for detecting transmission rate information using a matrix required when a transmission-data modulation signal is coded by a hierarchical repetition code and the repetition code is decoded by assuming each rate on the reception side.

The required Eb/I0 is generally known and is supplied from the base-station control section. Each of the multipliers 2A1 to 2AK multiplies transmission rate information sent from the first stage 14 through the switch 17 and the information for required Eb/I0. The sorting circuit 3 determines ranking of the users in descending order of values of [required Eb/10]×[transmission rate] obtained by the multipliers 2A1 to 2AK. The ranking information as the result of ranking is transmitted to the second stage 15 by selecting a target output with the switch 18. In this second stage 15, processing is performed based on this transmitted ranking information and transmission rate information for each user is newly detected.

In the same manner as the previous stage, each of the multipliers 2A1 to 2AK multiplies transmission rate information sent from the second stage 15 through the switch 17 and the information for required Eb/10. The sorting circuit 3 determines ranking of users in descending order of values of [required Eb/10]×[transmission rate]. In the next stage, processing is performed based on the result of ranking. From then on, the transmission rate information is updated in each stage and the ranking processing is repeated. In the final stage 16, the processing is executed based on the ranking information determined from the transmission rate information obtained in the immediately preceding stage. The sequence of temporary judgement of data for each user is the same as that explained in the conventional case with reference to FIG. 16 and FIG. 17, therefore, explanation of the sequence is omitted. As explained above, the effect of interference cancellation increases as the processing approaches the final stage and the degree of detection accuracy of transmission rate information is improved, which allows the cancellation effect to increase.

Figure 6:
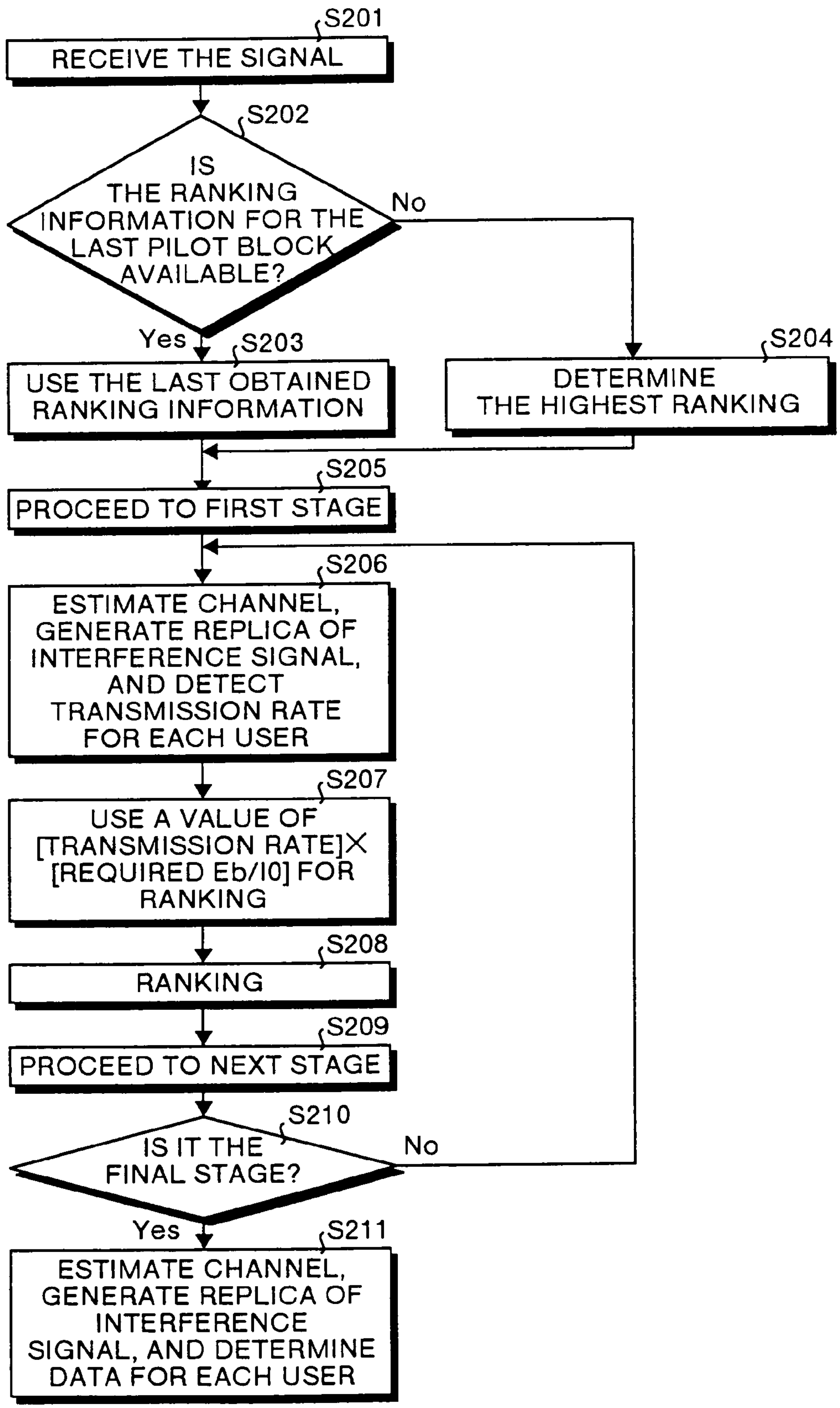
FIG. 6 is a flow chart showing the operation according to the second embodiment.

The overall operation is functionally explained below. FIG. 6 is a flow chart showing the operation according to the second embodiment. An incoming signal is received at step S201, and at step S202, it is determined whether the ranking information for the last pilot block is available or not by referring to the memory 12. As a result, when the ranking information is available, the process proceeds to step S203, where the last obtained ranking information is used. When the ranking information is not available, the process proceeds to step S204, where the user signal is ranked as the highest one.

When the ranking is determined at the step S203 or the step S204, the processing is shifted to the first stage 14 at step S205. Further, at step S206, channel estimation, generation of the replica of an interference signal, and detection of a transmission rate are executed for each user. At step S207, a value of [required Eb/I0]×[transmission rate] is obtained for each user. At step S208, ranking is then determined based on the result of computation.

The process then shifts to the second stage 15 at step S209, and it is determined at step S210 whether the current stage is the final stage 16. When the current stage is the final stage 16, the process proceeds to step S211, where channel estimation, generation of the replica of an interference signal, and data judgement for each user are performed. From the final stage and on, since there is no need to judge the ranking, there is also no need to detect the transmission rate information. On the other hand, if the current stage is not the final stage, the process returns to step S206 and the process in steps S206 to S210 is executed until the final stage is reached.

According to the second embodiment, when the required Eb/10 of the incoming signal is known but the transmission rate information is unknown, the processing for ranking is executed by referring to the last pilot block. Thus, in the same manner as the first embodiment there is no need to provide a device for measurement of incoming signal power. Therefore, the computing time for ranking can be shortened, and also the scale of hardware and power consumption can be reduced.

In the first and second embodiments, the processing for ranking, when the required Eb/10 and the transmission rate information for all users are known or when the required Eb/10 for all users is known and the transmission rate information for all users is unknown, is explained. However, this invention is not limited to these cases. Rank of the users can be determined even if there are some users whose transmission rate information is known and other users whose transmission rate information is unknown assuming that the required Eb/I0 is known. This case is explained here as the third embodiment.

Figure 7:
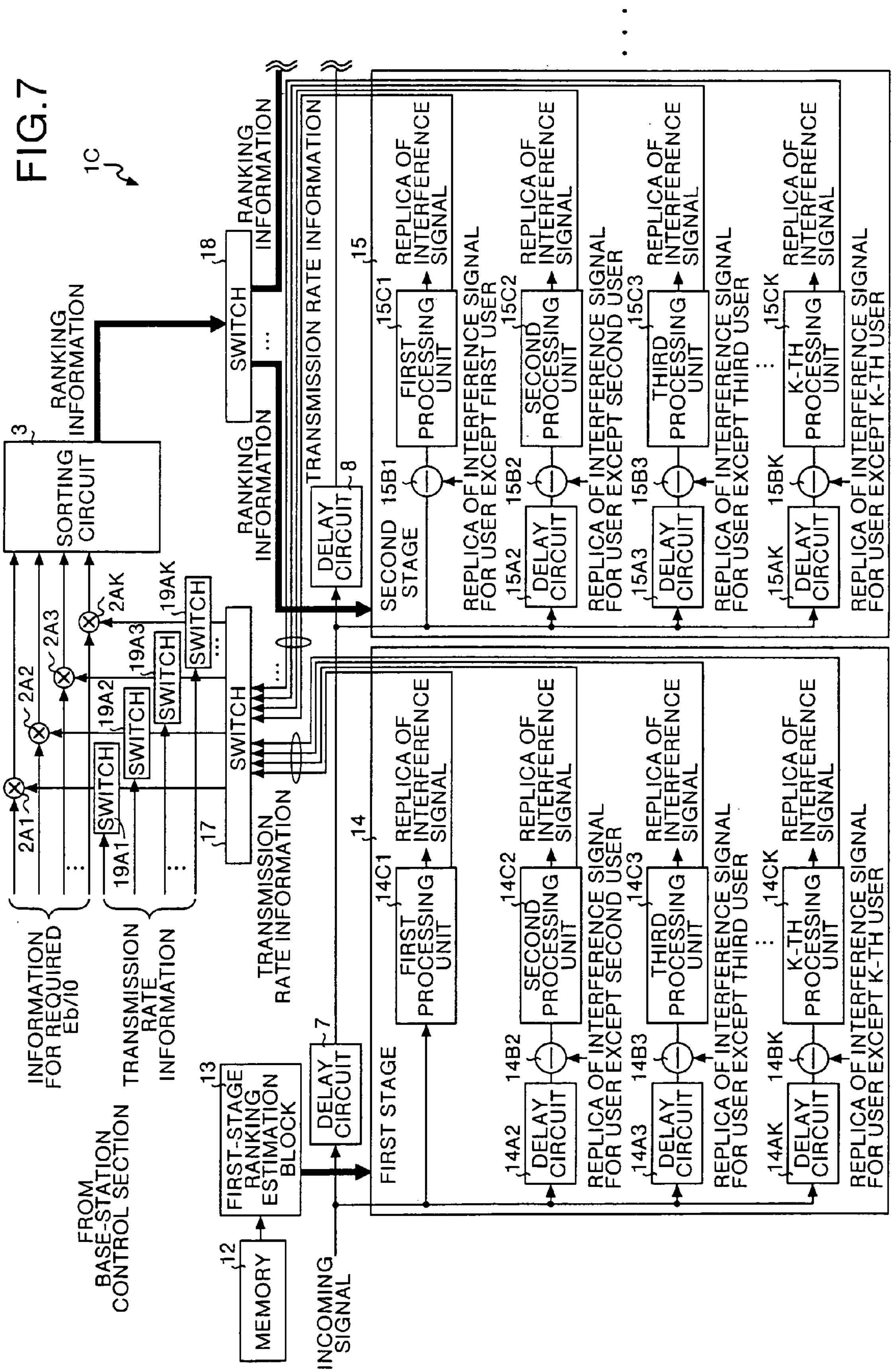
FIG. 7 is a portion of a block diagram showing an example of the configuration of a CDMA reception system in which an interference cancellation apparatus according to a third embodiment of this invention is applied.
Figure 8:
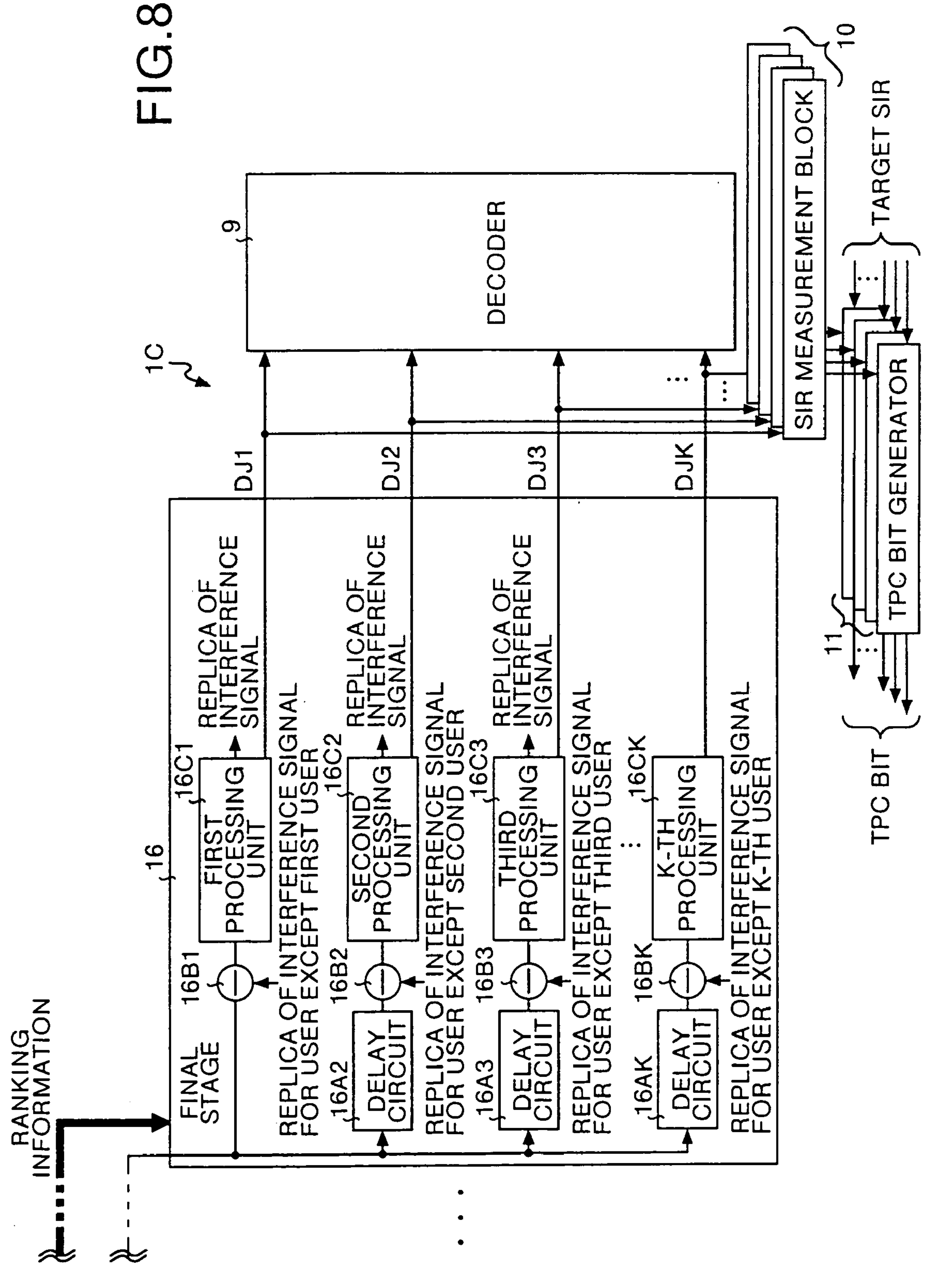
FIG. 8 is the remaining portion of the block diagram of the CDMA reception system shown in FIG. 7.

The number of users is assumed to be K. FIG. 7 and FIG. 8 are block diagrams showing an example of the configuration of a CDMA reception system in which an interference cancellation apparatus according to the third embodiment of this invention is applied. The CDMA reception system 1C comprises the multipliers 2A1 to 2AK; the sorting circuit 3; the interference cancellation apparatus having K (natural number) number of blocks of a first stage to a final stage 14, 15 to 16; (K-1) units of delay circuits 7, 8 . . . ; the switches 17 and 18; and switches 19A1 to 19AK; the decoder 9; the SIR measurement block 10; and the TPC bit generator 11.

The CDMA reception system 1C is based on the configuration of the second embodiment. In the third embodiment, it is assumed that the transmission rate information for some users is known but for other users is not known. Therefore, there are two cases where transmission rate information supplied from the base-station control section is used and where transmission rate information is internally generated in the interference cancellation apparatus of the CDMA reception system 1C. To realize such a configuration, the configurations of the first and the second embodiments are combined and the switches 19A1 to 19AK are newly incorporated into the combination.

Precisely, the switches 19A1 to 19AK connect respective output (transmission rate information) of the switch 17 to respective output of the base-station control section, and connect either one of the outputs to each input of the multipliers 2A1 to 2AK. Therefore, supply sources (base-station control section not shown/first stage 14 and stages 15 . . . 16) for transmission rate information to the multipliers 2A1 to 2AK are selected as necessary by the switches 19A1 to 19AK.

Operation of the CDMA reception system 1C is explained below. Operations that are the same as the conventional case and the second embodiment will be explained only in short. Since transmission rate information of a user signal is unknown in the first stage 14, it is impossible to obtain accurate ranking from an input signal. The first-stage ranking estimation block 13 estimates the ranking in this stage. The first-stage ranking estimation block 13 refers to the ranking information stored in the memory 12 for any user signal that has the ranking information for the last pilot block. Whereas, the highest ranking is given to any user signal that has no such ranking information because the signal may have maximum power.

Each of the first to K-th processing units 14C1 to 14CK of the first stage 14 performs channel estimation and generation of the replica of an interference signal for each user according to the ranking determined as explained above. At the same time each of the units detects transmission rate information included in a data symbol in each user signal and transmits the information to the switches 19A1 to 19AK through the switch 17. At this point of time, for ranking required for generating the replica of an interference signal as the following processing, the known transmission rate information supplied from the base-station control section is used for a user whose transmission rate information is known. On the other hand, the transmission rate information detected in the first stage 14 as the previous stage is used for a user whose transmission rate information is unknown. In this case, selection between the known transmission rate information and the unknown transmission rate information is executed by each of the switches 19A1 to 19AK for each user. The required Eb/I0 is generally known and is supplied from the base-station control section. Therefore, each of the multipliers 2A1 to 2AK multiplies transmission rate information sent from the first stage 14 through the switches 19A1 to 19AK and the information for required Eb/I0.

The sorting circuit 3 determines ranking of users in descending order of values of [required Eb/I0]×[transmission rate] obtained by the multipliers 2A1 to 2AK. The ranking information as the result of ranking is transmitted to the second stage 15 by selecting a target output by the switch 18. In this second stage 15, processing is performed based on this transmitted ranking information and transmission rate information for each user is newly detected.

With regard to the transmission rate information detected in stages from the second stage 15 and on, a supply of the information to the multipliers 2A1 to 2AK is determined according to whether the known transmission rate information is supplied from the base-station control section. That is, whether respective transmission rate information detected in each stage is to be used or not determined by switching the switches 19A1 to 19AK for each user.

Figure 9:
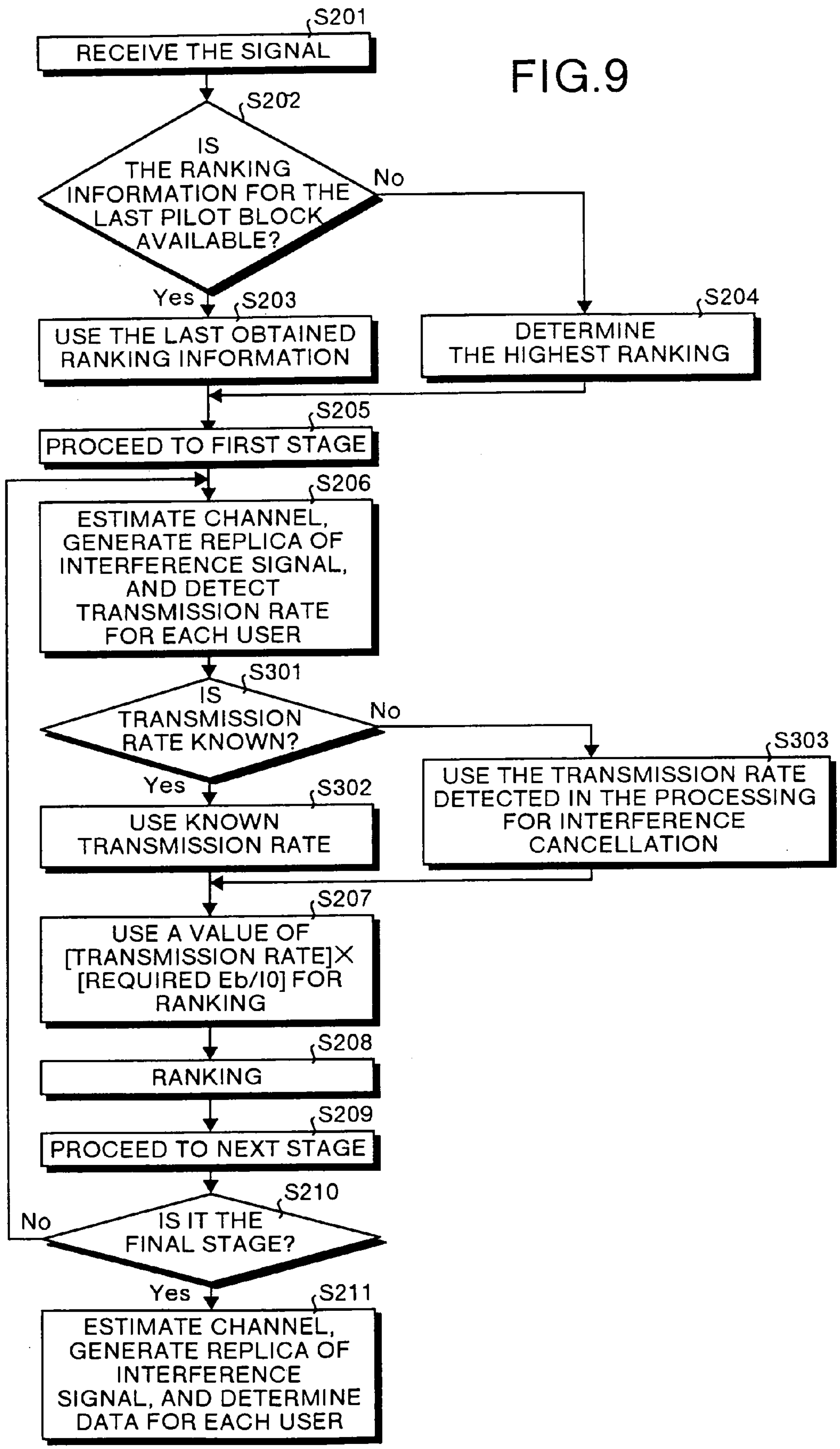
FIG. 9 is a flow chart showing the operation according to the third embodiment.

The overall operation is functionally explained below. FIG. 9 is a flow chart showing the operation according to the third embodiment. Only the points different from the second embodiment will be explained here. In the same manner as the second embodiment, in the third embodiment, channel estimation, generation of the replica of an interference signal, and detection of a transmission rate (transmission rate information) for each user are also performed in the first stage based on the determination of ranking at step S201 to step S206.

At step S301, it is determined whether the transmission rate (transmission rate information) is known for the user. When the transmission rate information is known, the process proceeds to step S302, where the known transmission rate is employed. On the other hand, when the transmission rate information is unknown, the process flow proceeds to step S303, where the measured value of the transmission rate information detected in the processing for interference cancellation in the previous stage is determined as a transmission rate. Ranking is then determined from step S207 to step S209 in the same manner as that of the second embodiment, and the process shifts to the next stage.

The loop processing (step S206 to step S210) including step S301 to step S303 is repeated until the process shifts to the final stage at step S210, and judgment values DJ1 to DJK are obtained at step S211 in the final stage.

According to the third embodiment, even if there are some users whose transmission rate information is known and other users whose transmission rate information is unknown assuming that the required Eb/I0 of a received signal is known ranks of the users can be determined. Thus, in the same manner as the first and second embodiments there is no need to provide a device for measuring the incoming signal power. Therefore, the computing time can be shortened, and also the scale of hardware and power consumption can be reduced.

First to third embodiments, explain the case in which transmission rate information can be estimated through transmission power control and received power can be estimated from required Eb/I0. However, this invention is not limited by these embodiments but like a fourth embodiment explained below, even if a signal on which transmission power control is not executed is included, ranking may be performed. There is a high speed packet signal as an example of the signal on which transmission power control is not executed. Precisely, since high speed transmission is performed within a short period of time, communications are finished before closed-loop control is applied, resultantly, transmission power control is not executed on the signal. Assuming such case, an interference cancellation apparatus that can also handle a packet signal is taken up as an example in this fourth embodiment.

Figure 10:
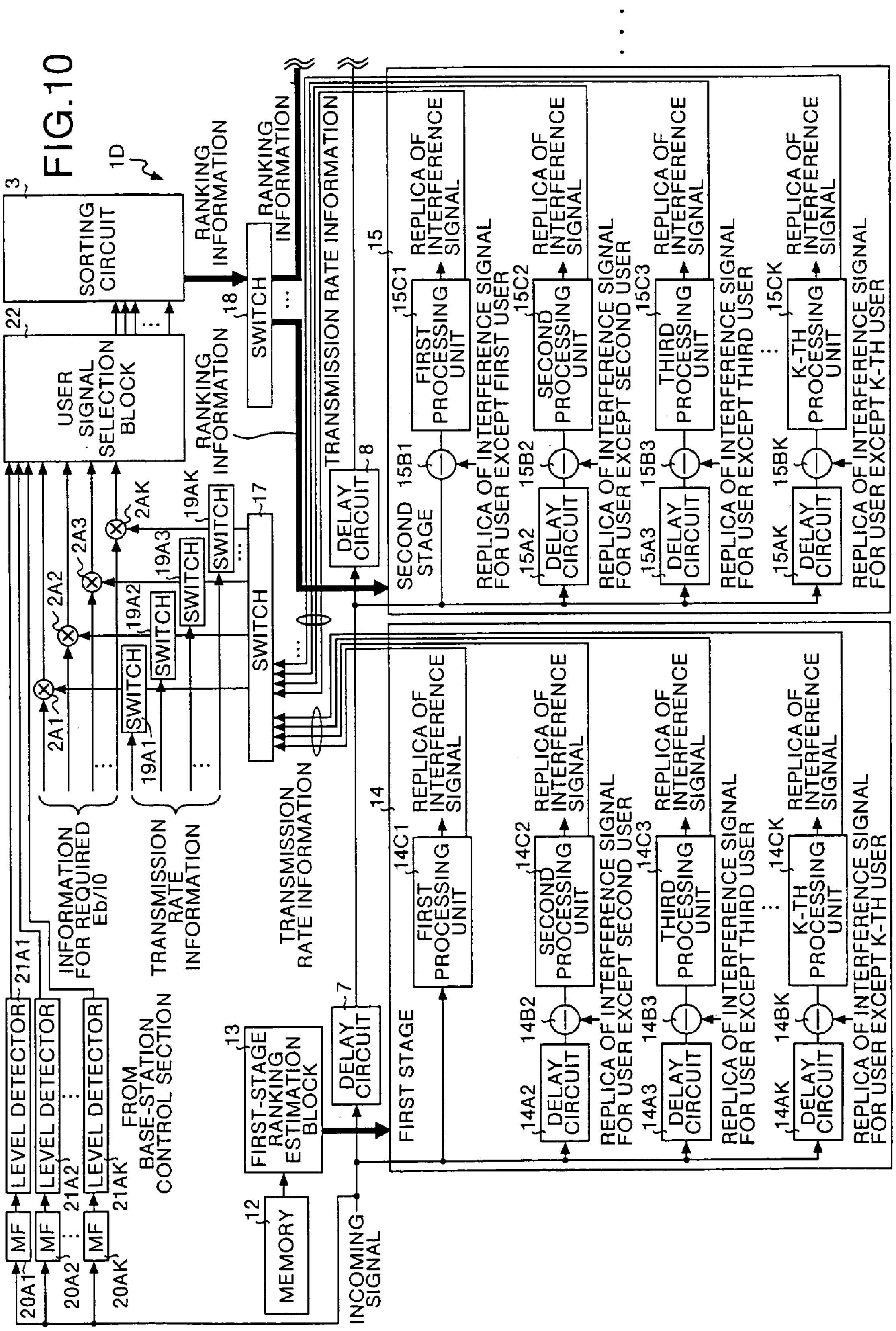
FIG. 10 is a portion of a block diagram showing an example of the configuration of a CDMA reception system in which an interference cancellation apparatus according to a fourth embodiment of this invention is applied.
Figure 11:
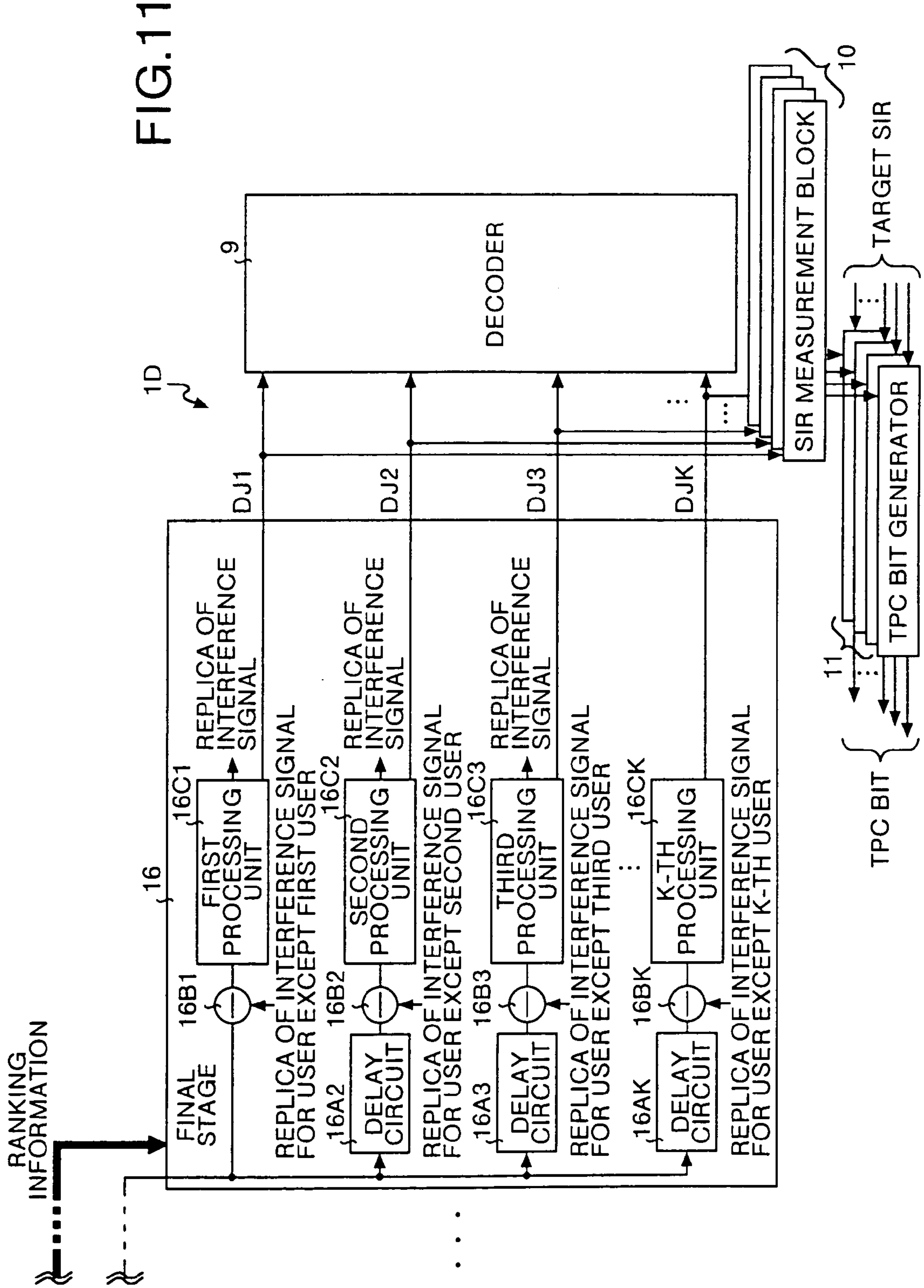
FIG. 11 is the remaining portion of the block diagram of the CDMA reception system shown in FIG. 10.

The number of users is assumed to be K. FIG. 10 and FIG. 11 are block diagrams showing an example of the configuration of a CDMA reception system in which an interference cancellation apparatus according to the fourth embodiment of this invention is applied. The CDMA reception system 1D comprises the multipliers 2A1 to 2AK; the sorting circuit 3; the interference cancellation apparatus having K (natural number) number of blocks of a first stage to a final stage 14, 15 to 16, (K-1) units of delay circuits 7, 8 . . . the switches 17 and 18; the switches 19A1 to 19AK; the matched filters 20A1 to 20AK; the level detectors 21A1 to 21AK; a user signal selection block 22; the decoder 9; the SIR measurement block 10; and the TPC bit generator 11.

The CDMA reception system 1D is based on the configuration of the third embodiment. In this fourth embodiment, the incoming signal power measurement block is required in order to measure the signal power of the packet signal on which transmission power control is not executed. Therefore, the matched filters 20A1 to 20AK and the level detectors 21A1 to 21AK are previous stage to the sorting circuit 3 which structure is the same as that of the conventional system. With regard to a signal on which transmission power control is executed, ranking can be determined from the [required Eb/I0]×[transmission rate] without passing through the received-signal power measurement block.

The user signal selection block 22, connected to the outputs of the level detectors 21A1 to 21AK and the outputs of the multipliers 2A1 to 2AK, is provided in the previous stage of the sorting circuit 3. This user signal selection block 22 selects which of the outputs is to be supplied to the sorting circuit 3 according to whether the incoming signal is a packet signal or the other signal (signal on which transmission power control is executed).

Operation of the CDMA reception system 1D is explained below. However, operations which are different from the conventional case and the third embodiment will only be explained. In the case of a packet signal, incoming packet signals are input into the matched filters 20A1 to 20AK corresponding to that particular user. The matched filters 20A1 to 20AK obtain correlation values, and the level detectors 21A1 to 21AK in the following stage measure the incoming signal level for each user. The measured incoming signal levels for each user are sent to the sorting circuit 3 via the user signal selection block 22. The sorting circuit 3 determines the rank of the users in descending order of power values of incoming signals obtained in the incoming signal power measurement block in the previous stage.

The case of a signal on which transmission power control has been executed is explained below. In this case, it is impossible to obtain accurate rank from the input signal because the transmission rate information for a user is not known in the first stage 14. Ranking estimate at this time is performed in the first-stage ranking estimation block 13. The first-stage ranking estimation block 13 referees to the ranking information stored in the memory 12 for a user signal with the ranking information for the last pilot block, whereas a user signal with no such ranking information is ranked as the highest because it may have the maximum power.

In each of the first to K-th processing units 14C1 to 14CK, channel estimation and generation of the replica of an interference signal for each user are performed according to the ranking determined as explained above. At the same time transmission rate information included in a data symbol in each user signal is detected, and the detected information is transferred to each of the next switches 19A1 to 19AK through the switch 17.

At this time, for the next ranking processing used to generate the replica of an interference signal, known transmission rate information supplied from the base-station control section is used for a user whose transmission rate information is known. On the other hand, transmission rate information detected in the first stage 14 as the previous stage is used for a user whose transmission rate information is not known. In that case, a selection of either one of the known transmission rate information and the unknown transmission rate information is carried out by the switches 19A1 to 19AK for each user. Since the required Eb/I0 is generally known and is supplied from the base-station control section, the multipliers 2A1 to 2AK multiply respective transmission rate information sent from the first stage 14 through the switches 19A1 to 19AK by the information for required Eb/I0. This result of multiplication is sent to the sorting circuit 3 via the user signal selection block 22. The sorting circuit 3 determines ranking of users in descending order of values of [required Eb/10]×[transmission rate] obtained in the multipliers 2A1 to 2AK.

Figure 12:
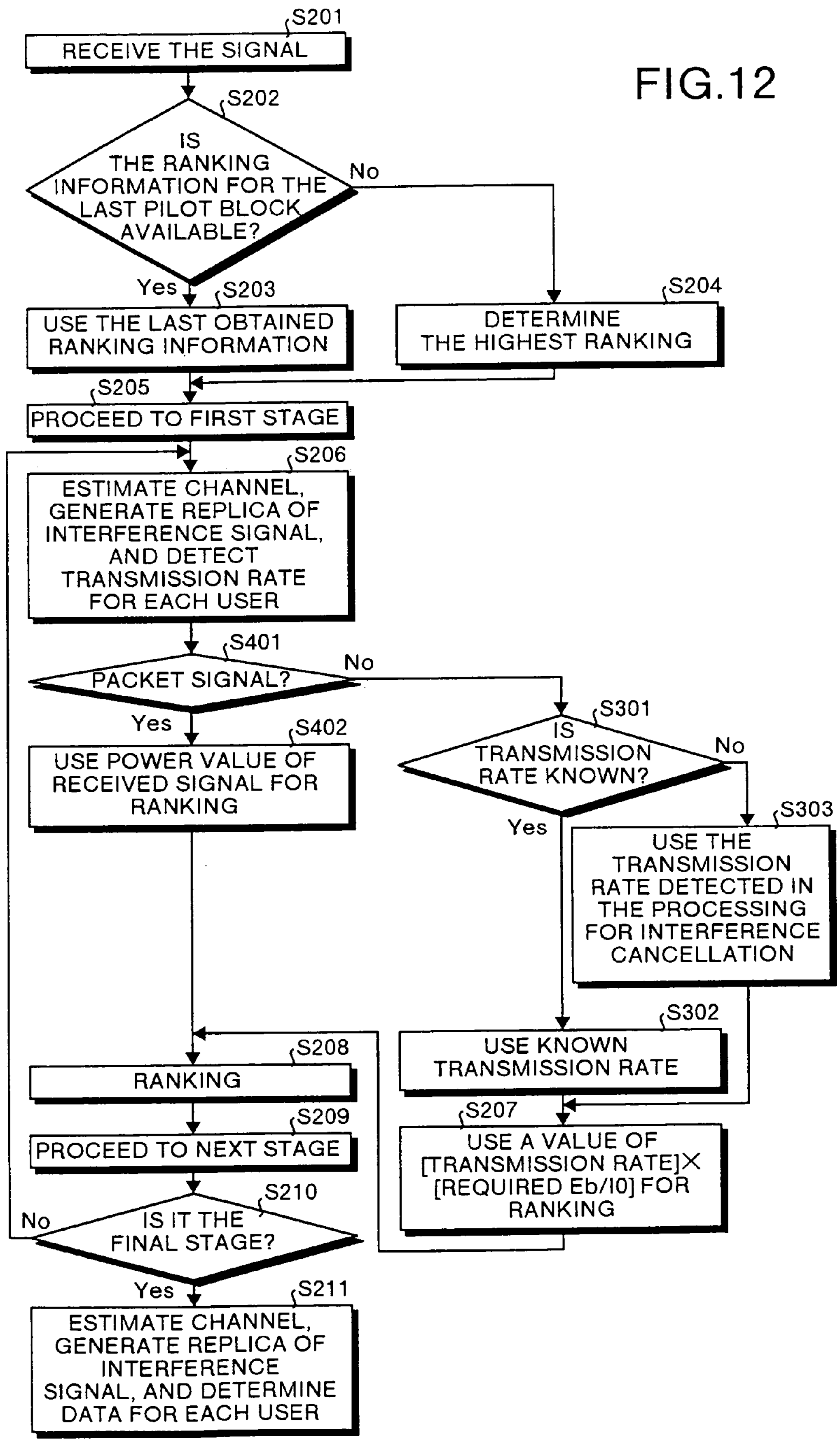
FIG. 12 is a flow chart showing the operation according to the fourth embodiment.

The overall operation is functionally explained below. FIG. 12 is a flow chart showing the operation according to the fourth embodiment. Those operations that are different from the third embodiment are only explained here. In the fourth embodiment, channel estimation, generation of the replica of an interference signal, and detection of a transmission rate (transmission rate information) for each user are performed in the first stage based on the determination of ranking at step S201 to step S206 in the same manner as that of the third embodiment.

At step S401, it is determined whether the incoming signal is a packet signal for each user. When the incoming signal is a packet signal, the process proceeds to step S402, where the power of the incoming signal is used for ranking processing. The process then proceeds to step S208. On the other hand, if the incoming signal is neither a packet signal nor a signal on which transmission power control is executed, the process proceeds to step S301, where it is further determined whether the transmission rate information is known for each user.

That is, at step S301, it is determined whether the transmission rate information is known for each user. When the transmission rate information is known, the process proceeds to step S302, where the known value is employed as a transmission rate. If the transmission rate information is unknown, on the other hand, the process proceeds to step S303, where the measured value of the transmission rate information detected in the processing for interference cancellation in the previous stage is determined as a transmission rate. From then on, ranking is determined at step S207 to step S209 in the same manner as that of the third embodiment, and the processing shifts to the next stage.

From then on, the loop processing (step S206 to step S210) including step S401 and step S402 is repeated until the processing shifts to the final stage at step S210. Judgement values DJ1 to DJK are obtained at step S211 in the final stage.

According to the fourth embodiment, the incoming signal power measurement block is required only to measure the signal power of the packet signal. Therefore, when a signal other than a packet signal is received, the computing time for ranking can be shortened and also power consumption can be reduced, like in the first to third embodiment. Accordingly, as a whole process, the computing time for ranking can be suppressed to the level as low as possible, and an increase in power consumption can also be suppressed to the level as low as possible.

A fifth embodiment explained below explains a case in which the configurations of the first to fourth embodiments is bundled together. Accordingly, when the transmission rate information is known, the operation equivalent to the first embodiment is performed, and when the transmission rate information is unknown, the operation equivalent to the fourth embodiment is performed.

Figure 13:
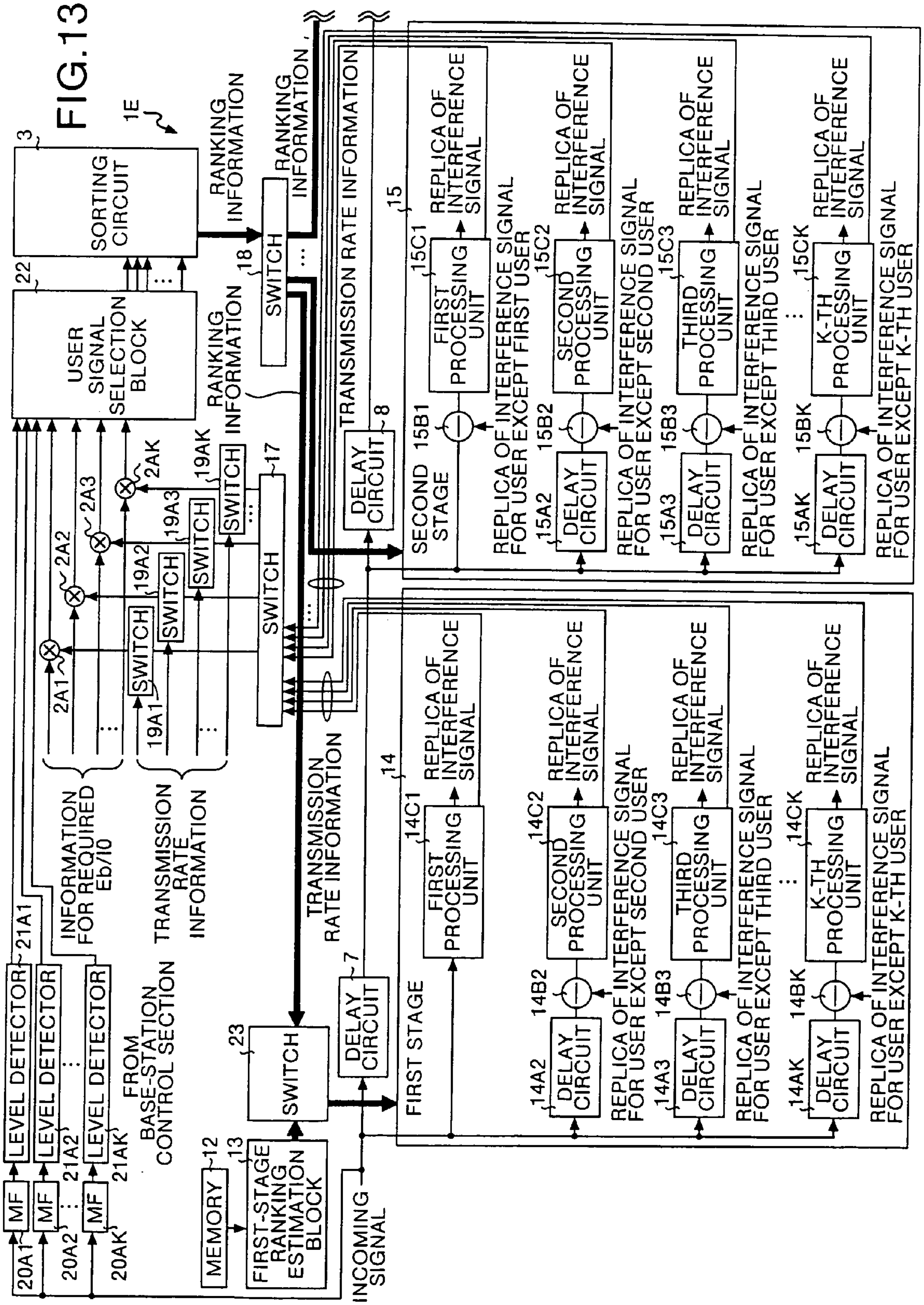
FIG. 13 is a portion of a block diagram showing an example of the configuration of a CDMA reception system in which an interference cancellation apparatus according to a fifth embodiment of this invention is applied.
Figure 14:
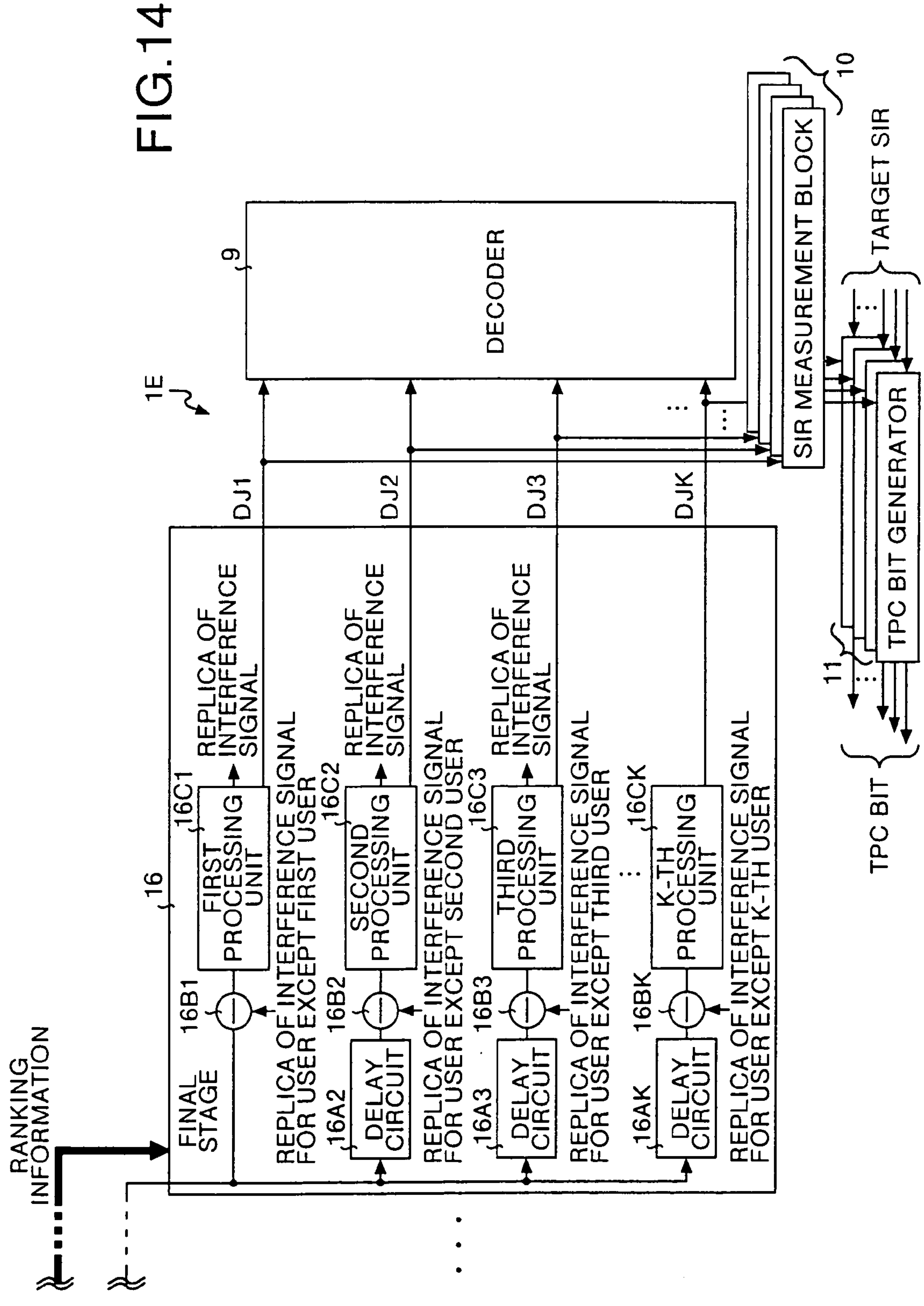
FIG. 14 is the remaining portion of the block diagram of the CDMA reception system shown in FIG. 13.

It is assumed that the number of users is K. FIG. 13 and FIG. 14 are block diagrams showing an example of the configuration of a CDMA reception system in which an interference cancellation apparatus according to the fifth embodiment of this invention is applied. The CDMA reception system 1E comprises the multipliers 2A1 to 2AK; the sorting circuit 3; the interference cancellation apparatus having K (natural number) number of blocks of a first stage to a final stage 14, 15 to 16; (K-1) units of delay circuits 7, 8 . . . ; the switches 17 and 18; the switches 19A1 to 19AK; the matched filters 20A1 to 20AK; the level detectors 21A1 to 21AK; the user signal selection block 22; switch 23; the decoder 9; the SIR measurement block 10; and the TPC-bit generator 11.

The CDMA reception system 1E is based on the configuration of the fourth embodiment. In this fifth embodiment, a processing mode is switched to the operation equivalent to that of the first embodiment or that of the fourth embodiment depending on whether the transmission rate information is known or unknown. According, the switch 23 is newly provided for the purpose of selecting between the modes. This switch 23 is connected between the outputs of the first-stage ranking estimation block 13 and the switch 18, and the first stage 14. This switch 18 has a difference from the switch 18 explained above in a connection line with the switch 23 newly added.

When transmission rate information is known, the switch 23 switches to output the output of the switch 18 to the first stage 14 in order to provide ranking information from the sorting circuit 3 to the first stage 14. This operation is similar to that of the first embodiment. When the transmission rate information is unknown, on the other hand, the switch 23 switches to output the output of the first-stage ranking estimation block 13 to the first stage 14, in order to provide ranking information from the first-stage ranking estimation block 13 to the first stage 14. This operation is similar to that of the third embodiment.

Operation of the CDMA reception system 1E is explained below. Operations which are different from the conventional case and the first to third embodiments are only explained here. When the incoming signal is not a pilot signal and both of required Eb/I0 and transmission rate information are known, all the switches 19A1 to 19AK are switched to output of the base-station control section. In this case, respective transmission rate information supplied from the base-station control section is multiplied by the required Eb/I0 supplied from the same base-station control section in each of the multipliers 2A1 to 2AK. Accordingly, the user signal selection block 22 supplies the outputs of the multipliers 2A1 to 2AK to the sorting circuit 3.

The sorting circuit 3 ranks the users in descending order of values based on the result of multiplication in the multipliers 2A1 to 2AK, and outputs the ranking information to the switch 23 via the switch 18. The input of the switch 23 at that state is switched to the switch 18, so that the ranking information sent from the switch 18 is transferred to the first stage 14. When the transmission rate information is known, as explained above, channel estimation and generation of the replica of an interference cancellation are performed according to the ranking obtained by [required Eb/I0]×[transmission rate] in the first stage 14. The operation from then on is the same as that of the first embodiment and therefore the explanation will be omitted.

When the required Eb/I0 is known but the transmission rate information is unknown accurate ranking can not be executed. Therefore, the input of the switch 23 is switched to the first-stage ranking estimation block 13. Accordingly, the ranking to be used in the first stage 14 is obtained through estimation. The operation in this case follows the operation of the third embodiment and therefore the explanation will be omitted.

Figure 15:
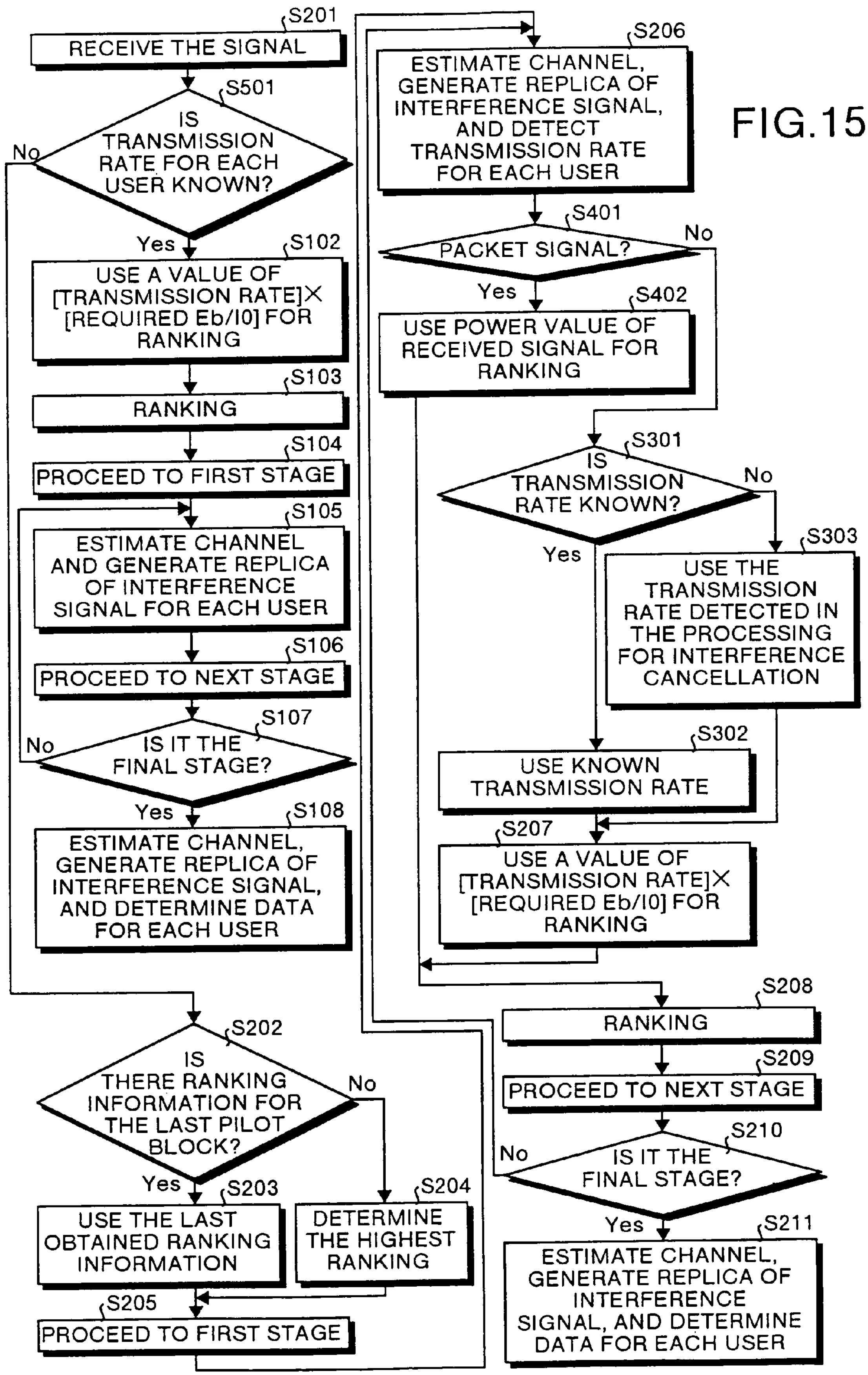
FIG. 15 is a flow chart showing the operation according to the fifth embodiment.

The overall operation is functionally explained below. FIG. 15 is a flow chart showing the operation according to the fifth embodiment. Operations which are different from the fourth embodiment are explained below. Upon reception of the incoming signal at step S201, it is determined, at step S501, whether the transmission rate information for all the users is known or unknown. When the transmission rate information for all the users is known, the process proceeds to step S102. Judgement values DJ1 to DJK are then obtained through step S102 to step S108 in the same manner as that of the first embodiment.

On the other hand, when the transmission rate information for all the users is unknown, the process proceeds to step S202. In this case, channel estimation, generation of the replica of an interference signal, and detection of a transmission rate (transmission rate information) for each user are performed in the first stage based on the determination of ranking at step S202 to step S206 in the same manner as that of the fourth embodiment.

At step S401, it is determined whether the incoming signal is a packet signal for each user. When the received signal is a packet signal, the process proceeds to step S402, and the power value of the incoming signal is used for ranking processing. The process then proceeds to step S208. On the other hand, if the incoming signal is neither a packet signal nor a signal on which transmission power control is executed, the process proceeds to step S301, and it is further determined whether the transmission rate information is know for each user.

That is, at step S301, it is determined whether the transmission rate information is known for each user. When the transmission rate information is known, the process proceeds to step S302, where the known value is employed as a transmission rate. If the transmission rate information is unknown, on the other hand, the process proceeds to step S303, where the measured value of the transmission rate information detected in the processing for interference cancellation in the previous stage is determined as a transmission rate. From then on, ranking is determined at step S207 to step S209 in the same manner as that of the third embodiment, and the processing shifts to the next stage.

From then on, the loop processing (step S206 to step S210) including step S401 and step S402 is repeated until the processing shifts to the final stage at step S210. Judgment values DJ1 to DJK are obtained at step S211 in the final stage.

According to the fifth embodiment, the configuration of this embodiment includes all the configurations of the first to fourth embodiments. Therefore, when the transmission rate information is know, ranking processing is carried out by the value of [required Eb/I0]×[transmission rate], thus the computing time for ranking can be shortened. On the other hand, when the transmission rate information is unknown, and when the incoming signal is a signal other than the packet signal, the computing time for ranking can be shortened and also power consumption can be reduced, like in the first to fourth embodiment.

In the first to fifth embodiments, the ranking processing is carried out based on the product [required Eb/I0]×[transmission rate]. However, the transmission rate information is the dominant factor that determines the ranking. The required Eb/I0 varies in a range from $10^{-3}$ (in the case of voice communications) to $10^{-6}$ (in the case of data communications). However, an error-correction code with high accuracy is used on data communications. Therefore, the variations in actual cases do not occur so widely, resultantly there is little difference between rankings. Accordingly, ranking processing may be performed using only the transmission rate information, which is effective in the aspect of simplification of the device. In this case, the ranking is executed only by the transmission rate at step S102 and step S207 in the flow charts of FIG. 3, FIG. 6, FIG. 9, FIG. 12, and FIG. 15.

As explained above, according to one aspect of this invention, when transmission rate information is known, ranking between users is determined based on the known transmission rate information. Therefore, any component that measures the incoming signal power is not required. Accordingly, it is possible to obtain the interference cancellation apparatus applied in the CDMA communication system which can shorten the computing time for ranking processing and also reduce the scale of hardware and power consumption.

According to another aspect of this invention, when transmission rate information and the required quality information are known, rank of the users can be determined based on both the transmission rate information and the required quality information. Therefore, any component that measures the incoming signal power is not required. Accordingly, it is possible to obtain the interference cancellation apparatus applied in the CDMA communication system which can shorten the computing time for ranking processing and also reduce the scale of hardware and power consumption.

According to still another aspect of this invention, when transmission rate information unknown, interference cancellation is performed by at least a number of stages corresponding to a number of users based on ranking arbitrarily given in each of the stages. Further, the transmission rate information is detected. and arbitrary ranking to be used in the following stage is updated based on the respective transmission rate information detected in each stage. Therefore, any component that measures the incoming signal power is not required even if the transmission rate information by user is unknown. Accordingly, it is possible to obtain the interference cancellation apparatus applied in the CDMA communication system which can shorten the computing time for ranking processing and also reduce the scale of hardware and power consumption.

According to still another aspect of this invention, when transmission rate information is unknown but the required quality information is known, interference cancellation is performed by at least a number of stages corresponding to a number of users based on ranking arbitrarily given in each of the stages. Further, the transmission rate information is detected and arbitrary ranking to be used in the following stage is updated based on the respective transmission rate information detected in each stage and known required quality information. Therefore, any component that measures the incoming signal power is not required even if the transmission rate information is unknown. Accordingly, it is possible to obtain the interference cancellation apparatus applied in the CDMA communication system which can shorten the computing time for ranking processing and also reduce the scale of hardware and power consumption.

According to still another aspect of this invention, when the transmission rate information for some users is known but for others is unknown, interference cancellation is performed by at least a number of stages corresponding to a number of users based on ranking arbitrarily given in each of the stages. Further, the transmission rate information is detected and for the users whose transmission rate information is known, ranking between the users is determined based on the known transmission rate information by user. For the users whose transmission rate information is unknown, arbitrary ranking to be used in the following stage is updated based on the transmission rate information detected in each stage. Therefore, any component that measures the incoming signal power is not required even if the transmission rate information for some users is unknown. Accordingly, it is possible to obtain the interference cancellation apparatus applied in the CDMA communication system which can shorten the computing time for ranking processing and also reduce the scale of hardware and power consumption.

According to still another aspect of this invention, when the transmission rate information for some users is known and for others is unknown, interference cancellation is performed by at least a number of stages corresponding to a number of users based on ranking arbitrarily given in each of the stages. Further, the transmission rate information is detected and for the users whose transmission rate information is known, ranking between the users is determined based on the known transmission rate information and known required quality information. Whereas, for the users whose transmission rate information is unknown, arbitrary ranking to be used in the following stage is updated based on the transmission rate information detected in each stage and known required quality information. Therefore, any component that measures the incoming signal power is not required irrespective of whether the transmission rate information is known or unknown. Accordingly, it is possible to obtain the interference cancellation apparatus applied in the CDMA communication system which can shorten the computing time for ranking processing and also reduce the scale of hardware and power consumption.

Further, the incoming signal power is estimated based on the product of the transmission rate information and the required quality information. Therefore, it is possible to obtain the interference cancellation apparatus applied in the CDMA communication system which can improve the degree of accuracy of required quality.

Further, the incoming signal power is estimated transmission rate information and the required quality information. The rank of the users is updated based on the estimated signal power. Therefore, it is possible to obtain the interference cancellation apparatus applied in the CDMA communication system which can improve the degree of accuracy of required quality in each stage.

Further, the last obtained ranking is used for interference cancellation in the first stage. Therefore, it is possible to obtain the interference cancellation apparatus applied in the CDMA communication system which can realize required interference cancellation without much difference in the rankings.

Further, when there is a user whose rank is not stored in the last obtained ranking, the rank of this user is determined as the highest one. Therefore, it is possible to obtain the interference cancellation apparatus applied in the CDMA communication system which can realize required interference cancellation without omission of ranking for any user.

Further, in the interference cancellation apparatus which enables determination and updating of ranking, the last obtained ranking is used for the interference cancellation in the first stage. Therefore, it is possible to obtain the interference cancellation apparatus applied in the CDMA communication system which can realize required interference cancellation without much difference in the rankings.

Further, in the first stage, when transmission rate information is known, interference cancellation is performed by selecting the determined ranking. On the other hand, when transmission rate information is unknown, interference cancellation is performed by selecting the last obtained ranking. Therefore, it is possible to obtain the interference cancellation apparatus applied in the CDMA communication system which can realize required interference cancellation using the most adequate ranking as necessary.

Further, in the interference cancellation apparatus which enables determination and updating of ranking, when there is a user whose rank is not stored in the last obtained ranking, the rank of this user is determined as the highest one. Therefore, it is possible to obtain the interference cancellation apparatus applied in the CDMA communication system which can realize required interference cancellation without omission of ranking for any user.

Further, when any signal on which transmission power control is not executed is received, ranking is determined user by user based on the level of the received signal. Therefore, the processing for measuring the incoming signal power of at least the signal on which transmission power control is executed is eliminated. Accordingly, it is possible to obtain the interference cancellation apparatus applied in the CDMA communication system which can shorten the computing time for ranking processing and also reduce power consumption.

According to still another aspect of this invention, when transmission rate information is known, there includes a step of determining rank of the users based on the known transmission rate information by user and known required quality information. Therefore, the processing for measuring the incoming signal power is eliminated. Accordingly, it is possible to obtain the interference cancellation method applied in the CDMA communication system which can shorten the computing time for ranking processing.

According to still another aspect of this invention, when transmission rate information by user is unknown, there includes a step of performing interference cancellation by at least a number of stages corresponding to a number of users based on ranking arbitrarily given in each of the stages, and also detecting transmission rate information. Further, there includes a step of updating arbitrary ranking to be used in the following stage based on the transmission rate information detected in each step and known required quality information. Therefore, the processing for measuring the incoming signal power is eliminated even if the transmission rate information is unknown. Accordingly, it is possible to obtain the interference cancellation method applied in the CDMA communication system which can shorten the computing time for ranking processing.

According to still another aspect of this invention, when the transmission rate information for some users is known and for others is unknown, there includes a step of performing interference cancellation by at least a number of stages corresponding to a number of users based on ranking arbitrarily given in each of the stages, and also detecting transmission rate information. Further, for the users whose transmission rate information is known, there includes a step of determining rank of the users based on the known transmission rate information and the known required quality information. Whereas, for the users whose transmission rate information is unknown, there also includes a step of updating arbitrary ranking to be used in the next stage based on the transmission rate information detected in each stage and the known required quality information. Therefore, the processing for measuring the incoming signal power is eliminated irrespective of whether the transmission rate information is known or unknown. Accordingly, it is possible to obtain the interference cancellation method applied in the CDMA communication system which can shorten the computing time for ranking processing.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An interference cancellation apparatus, applied in a CDMA communication system in which transmission rate information for each user in a plurality of users is known, and configured to sequentially cancel the interference among each of said users based on a rank of each user, said apparatus comprising:

a rank determination unit configured to determine the rank of each user, from a highest ranked user to a lowest ranked user, based on the known transmission rate information of each user, wherein the known transmission rate of each user is not detected by measuring signal power;

a plurality of interference cancellation units, connected by at least a number of stages corresponding to a number of said users, wherein each interference cancellation unit is configured to perform interference cancellation based on a rank provided in each stage, and each interference cancellation unit is configured to detect the transmission rate information; and a rank updating unit configured to update the rank to be used in interference cancellation units of a following stage based on the transmission rate information detected in each of said interference cancellation units.

2. The interference cancellation apparatus applied in the CDMA communication system according to claim 1, further comprising:

a level ranking determination unit configured to determine the rank of each user based on a level of an incoming signal when the incoming signal is a signal on which transmission power control is not executed.

3. The interference cancellation apparatus applied in the CDMA communication system according to claim 1, wherein a first interference cancellation unit of said plurality of interference cancellation units stores a rank of said users obtained in a previous calculation and uses the rank for a current calculation.

4. The interference cancellation apparatus applied in the CDMA communication system according to claim 1, further comprising:

a level ranking determination unit configured to determine the rank of each user based on a level of an incoming signal when the incoming signal is a signal on which transmission power control is not executed.

5. An interference cancellation apparatus, applied in a CDMA communication system in which transmission rate information and required quality information for each user in a plurality of users is known, and configured to sequentially cancel the interference among each of said users based on a rank of each user, said apparatus comprising:

a rank determination unit configured to estimate an incoming signal power for each user based on the known transmission rate information and the required quality information for each respective user and to determine the rank of each user, from a highest ranked user to a lowest ranked user, based on the estimated incoming signal power.

6. The interference cancellation apparatus applied in the CDMA communication system according to claim 5, wherein said rank determination unit is configured to estimate the incoming signal power for each user based on a product of the transmission rate information and the required quality information for each respective user.

7. The interference cancellation apparatus applied in the CDMA communication system according to claim 5, further comprising:

a level ranking determination unit configured to determine the rank of each user based on a level of an incoming signal when the incoming signal is a signal on which transmission power control is not executed.

8. An interference cancellation apparatus, applied in the CDMA communication system according to claim 5, further comprising:

a plurality of interference cancellation units, connected by at least a number of stages corresponding to a number of said users, wherein each interference cancellation unit is configured to perform interference cancellation based on a rank provided in each stage, and each interference cancellation unit is configured to detect the transmission rate information; and a rank updating unit configured to update the rank to be used in interference cancellation units of a following stage based on the transmission rate information detected in each of said interference cancellation units and the known required quality information.

9. The interference cancellation apparatus applied in the CDMA communication system according to claim 8, wherein said rank determination unit is configured to estimate an incoming signal power for each user based on a product of the transmission rate information and the required quality information for each respective user, and is configured to update the rank of each user based on the estimated incoming signal power.

10. The interference cancellation apparatus applied in the CDMA communication system according to claim 8, wherein a first interference cancellation unit of said plurality of interference cancellation units stores a rank of said users obtained in a previous calculation and uses the rank for a current calculation.

11. The interference cancellation apparatus applied in the CDMA communication system according to claim 8, further comprising:

a level ranking determination unit configured to determine the rank of each user based on a level of an incoming signal when the incoming signal is a signal on which transmission power control is not executed.

12. An interference cancellation apparatus, applied in a CDMA communication system in which transmission rate information for some users in a plurality of users is known, but for other users in the plurality of users is unknown, and required quality information for each user is known, and which is configured to sequentially cancel the interference among said users based on a rank of each user, said apparatus comprising:

a plurality of interference cancellation units, connected by at least a number of stages corresponding to a number of said users, wherein each interference cancellation unit is configured to perform interference cancellation based on a rank provided in each stage, and each interference cancellation unit is configured to detect the transmission rate information;

a rank determination unit configured to determine the rank of each user whose transmission rate information is known based on the known transmission rate information of each user;

a rank updating unit which, for the users whose transmission rate information is unknown, is configured to update a rank to be used in interference cancellation units of a following stage based on the transmission rate information detected in each of said interference cancellation units; and a selection unit configured to select the rank determined by said rank determination unit for said users whose transmission rate information is known, and to select the rank updated by said rank updating unit for said users whose transmission rate information is unknown.

13. An interference cancellation apparatus, applied in a CDMA communication system in which transmission rate information for some users in a plurality of users is known, but for other users in the plurality of users is unknown, and required quality information for each user is known, and which is configured to sequentially cancel the interference among said users based on a rank of each user, said apparatus comprising:

a plurality of interference cancellation units, connected by at least a number of stages corresponding to a number of said users, wherein each interference cancellation unit is configured to perform interference cancellation based on a rank provided in each stage, and each interference cancellation unit is configured to detect the transmission rate information;

a rank determination unit configured to determine the rank of each user whose transmission rate information is known based on the known transmission rate information and required quality information for each user;

a rank updating unit which, for the users whose transmission rate information is unknown, is configured to update a rank to be used in interference cancellation units of a following stage based on the transmission rate information detected in each of said interference cancellation units and the known required quality information; and a selection unit configured to select the rank determined by said rank determination unit for said users whose transmission rate information is known, and to select the rank updated by said rank updating unit for said users whose transmission rate information is unknown.

14. The interference cancellation apparatus applied in the CDMA communication system according to claim 13, wherein said rank determination unit is configured to estimate an incoming signal power for each user based on a product of the transmission rate information and the required quality information for each respective user, and is configured to determine the rank of each user based on the estimated incoming signal power.

15. The interference cancellation apparatus applied in the CDMA communication system according to claim 13, wherein said rank determination unit is configured to estimate an incoming signal power for each user based on a product of the transmission rate information and the required quality information for each respective user, and is configured to update the rank of each user based on the estimated incoming signal power.

16. The interference cancellation apparatus applied in the CDMA communication system according to claim 13, wherein a first interference cancellation unit of said plurality of interference cancellation units stores a rank of said users obtained in a previous calculation and uses the rank for a current calculation.

17. The interference cancellation apparatus applied in the CDMA communication system according to claim 16, wherein said first interference cancellation unit uses the rank determined in said rank determination unit when said selection unit selects the rank determined by said rank determination unit, and uses the stored rank when said selection unit selects the rank determined by said rank updating unit.

18. The interference cancellation apparatus applied in the CDMA communication system according to claim 16, wherein when a user whose rank is not stored in the previous calculation, said first interference cancellation unit is configured to determine the rank of that user to be a highest rank.

19. The interference cancellation apparatus applied in the CDMA communication system according to claim 13, further comprising:

a level ranking determination unit configured to determine the rank of each user based on a level of an incoming signal when the incoming signal is a signal on which transmission power control is not executed.

* * * * *